March 5, 1963 W. R. MILLER ET AL 3,079,822
AXLE LATHE
Filed May 2, 1962 19 Sheets-Sheet 1
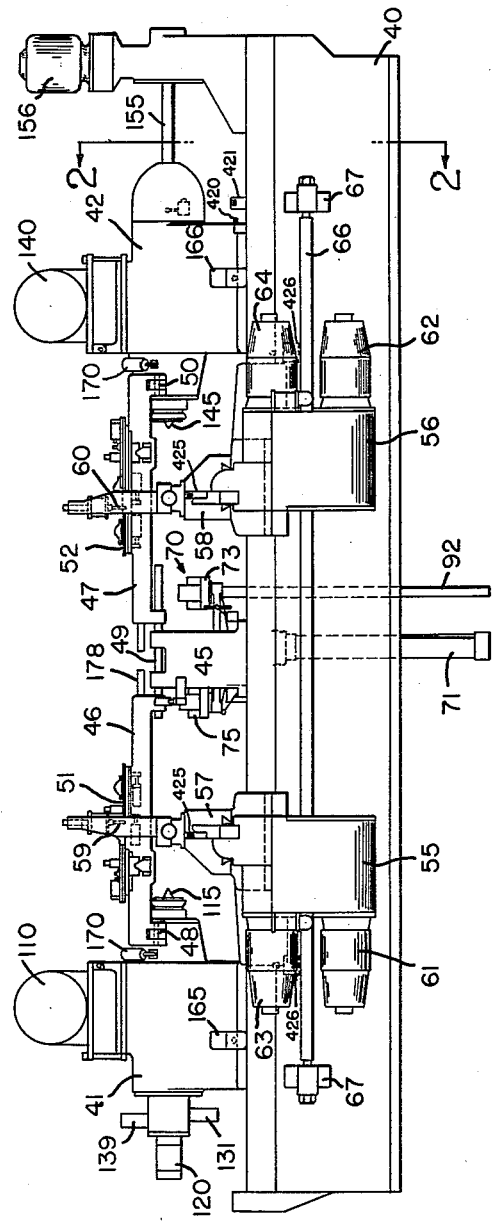
FIG. I.
INVENTORS
WILLIAM R. MILLER AND
FREDERIC WILLIAM YOUNG
BY PETER HOLD
Attorney March 5, 1963   W. R. MILLER ET AL   3,079,822
AXLE LATHE Filed May 2, 1962   19 Sheets-Sheet 4

INVENTORS
WILLIAM R. MILLER AND
FREDERIC WILLIAM YOUNG
BY          PETER HOLD

Attorney

March 5, 1963 W. R. MILLER ET AL 3,079,822
AXLE LATHE
Filed May 2, 1962 19 Sheets-Sheet 6

INVENTORS
WILLIAM R. MILLER AND
FREDERIC WILLIAM YOUNG
BY PETER HOLD
Attorney

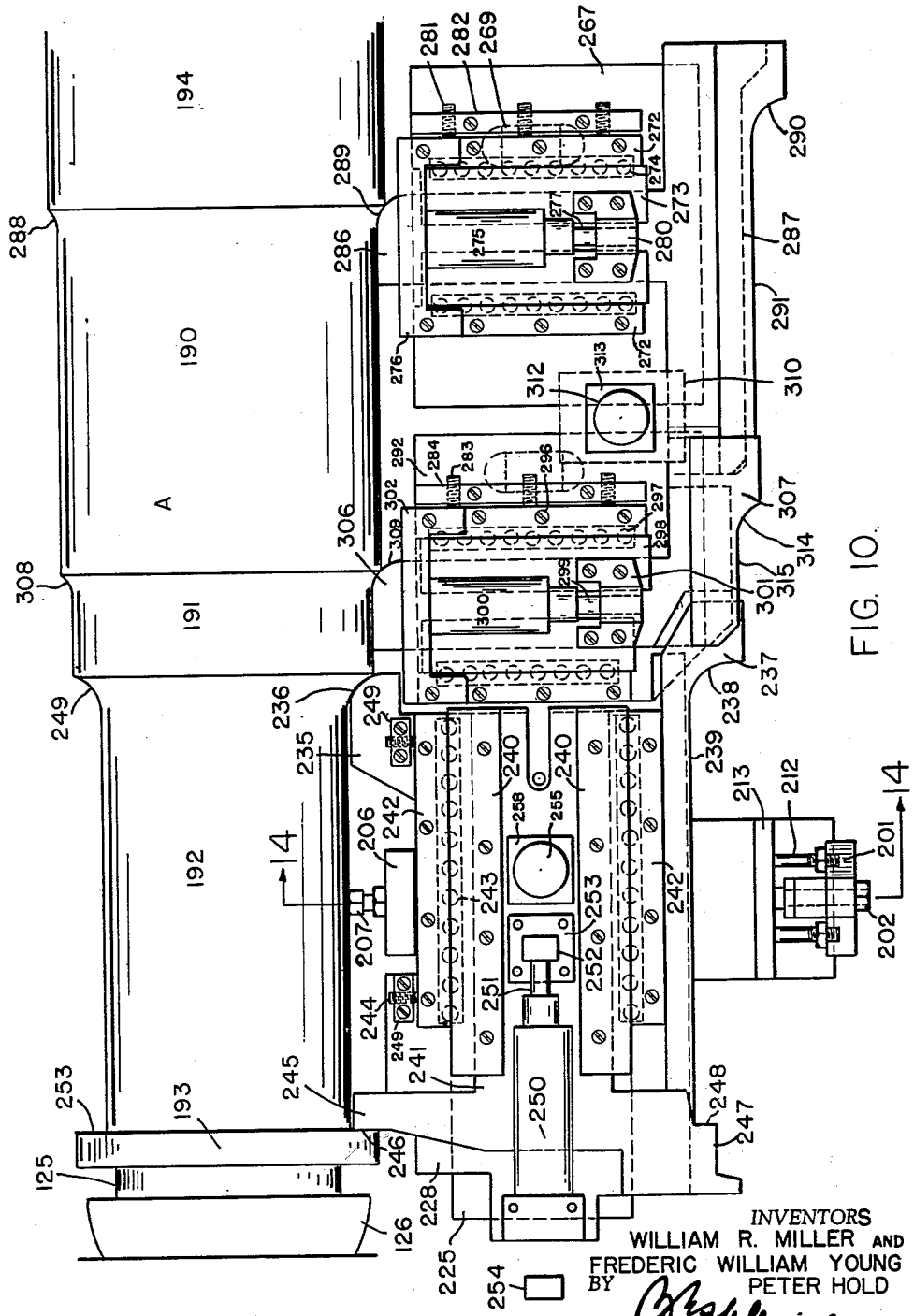

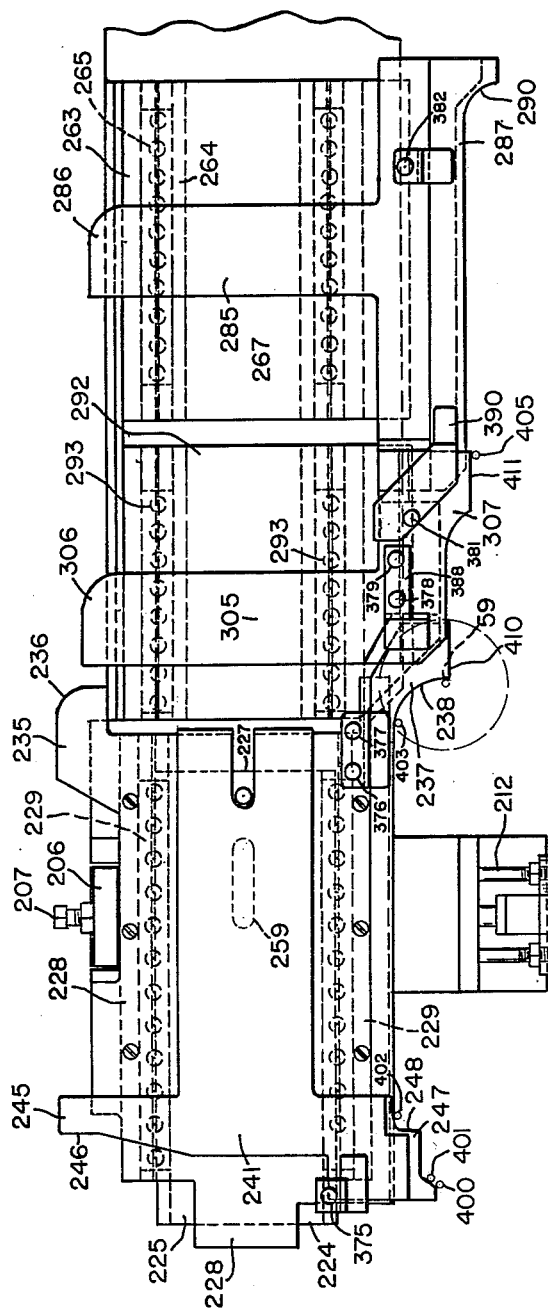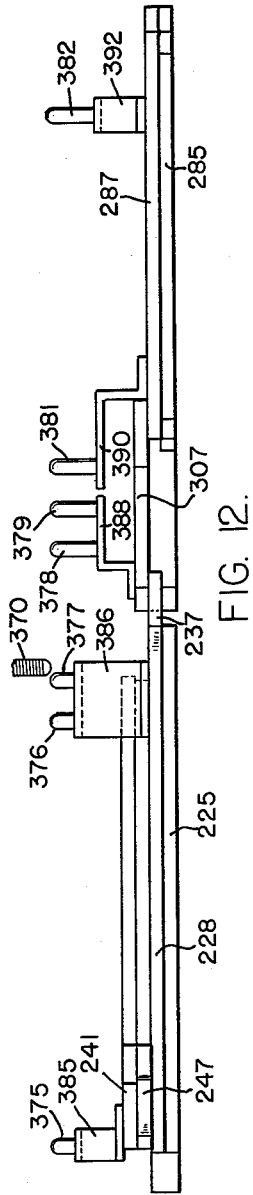

INVENTORS
WILLIAM R. MILLER AND
FREDERIC WILLIAM YOUNG
PETER HOLD
BY
Attorney

March 5, 1963  W. R. MILLER ET AL  3,079,822
AXLE LATHE

Filed May 2, 1962  19 Sheets-Sheet 14

INVENTORS
WILLIAM R. MILLER AND
FREDERIC WILLIAM YOUNG
BY                PETER HOLD

Attorney

March 5, 1963 W. R. MILLER ET AL 3,079,822
AXLE LATHE
Filed May 2, 1962 19 Sheets-Sheet 15

INVENTORS
WILLIAM R. MILLER,
FREDERIC WILLIAM YOUNG
BY AND PETER HOLD

*Attorney*

INVENTORS
WILLIAM R. MILLER,
FREDERIC WILLIAM YOUNG
AND PETER HOLD
BY
Attorney

United States Patent Office 3,079,822
Patented Mar. 5, 1963

3,079,822
AXLE LATHE
William R. Miller, Rochester, and Frederic William Young, Canandaigua, N.Y., and Peter Hold, Milford, Conn., assignors to Consolidated Machine Tool Division of Farrel-Birmingham Company, Inc., Rochester, N.Y., a corporation of Connecticut
Filed May 2, 1962, Ser. No. 193,895
23 Claims. (Cl. 82—14)

The present invention relates to machine tools and more particularly to an automatic machine for turning railroad car axles, that is, to an axle lathe. This application is a continuation-in-part of our copending application Serial No. 770,347, filed October 29, 1958, now abandoned.

One object of the present invention is to provide a machine which will take an axle, and machine its bearing fits or journals, its dust guard fits, and its wheel fits automatically, and completely, and without continued or intermittent attention of an operator.

Another object of the invention is to provide a machine of the character described which will automatically chuck and center an axle, machine its parts as recited, and then automatically eject the axle and place it on a conveyor by which it may be transported, for instance to an assembly area for assembly of the wheels on the axle.

Axles come in various lengths, and the areas which are to be machined may, therefore, be in different positions on different axles. Another object of the present invention, then, is to provide in a machine of the character described means for automatically sensing the locations of the areas which are to be machined and for automatically setting controls so that those areas will be machined properly.

Another object of the invention is to provide a machine which can sense and gauge the bearing fits of a previously roughed axle and from the radii connecting those bearing fits can set the tool control members so that those radii will be precisely machined within a few thousandths of an inch.

Another object of the invention is to provide a machine of the character described on which both ends of the axle can be sensed simultaneously, the controls for the machining operation on both ends can be set simultaneously, and both ends of the axle can be machined simultaneously.

A further object of the invention is to provide a machine of the character described on which the dust guard areas and the wheel fit areas can be turned to have a specific reduction in diameter without having specific diameters, while the bearing fit areas of the axle are machined by not less than a minimum specified reduction in diameter to one of a selected number of standard size axle bearing fit diameters, whereby the bearing fit diameters will be suitable without further machining to receive one of a selected predetermined number of standard bearing shells that can be held in stock.

Still another object of the invention is to provide a machine of the character described which will produce machine fits within the requirements and needs of the railroad industry and without subsequent operations.

Another object of the invention is to provide a machine of the character described in which the machining operations are controlled by templates, and having means for accurately positioning the work in the machine with reference to the templates.

Another object of the invention is to provide an axle lathe in which the positions of the tools for turning the various areas, which are to be machined, are controlled during the turning operation by templates composed of adjustable and removable parts so that the most economical removal of metal can readily be achieved.

Another object of the invention is to provide a machine of the character described in which the tooling is designed to effect the complete turning operation in a minimum of time.

A further object of the invention is to provide a machine of the character described having a plurality of tools for turning, respectively, different areas of the axle, thereby to attain most efficient turning operation.

Another object of the invention is to provide a machine of the character described in which the points of entry of the respective turning tools into the cut, and the points of backing of the tools away from the cut are controlled accurately and automatically.

Other objects of the invention will be apparent hereinafter from the specification and from the recital of the appended claims when considered in connection with the accompanying drawings.

In the drawings:

FIG. 1 is a front elevation of a machine built according to one embodiment of this invention;

FIG. 10 is a plan view of the template assembly but with the control nubs removed, and showing the probes in engagement with an axle which is to be turned;

FIG. 11 is a plan view in a plane below the plane of FIG. 10, further showing the templates and their mounting, and also showing the nubs which are mounted on the templates insuring uniform, non-undulating cuts across the bearing and wheel fits;

FIG. 12 is a side view of the templates showing the control nubs mounted thereon;

Figure 27A:
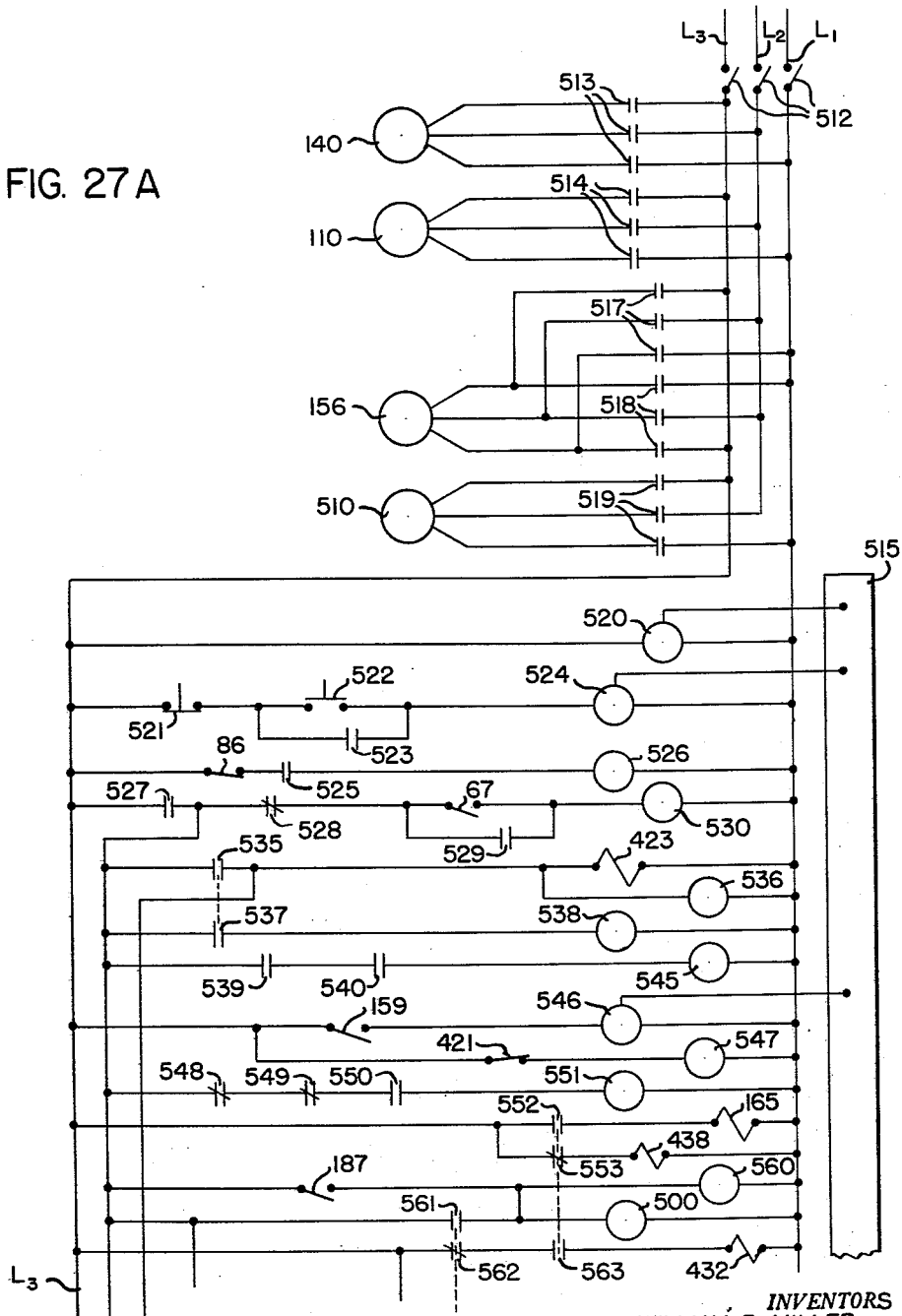
Figure 27B:
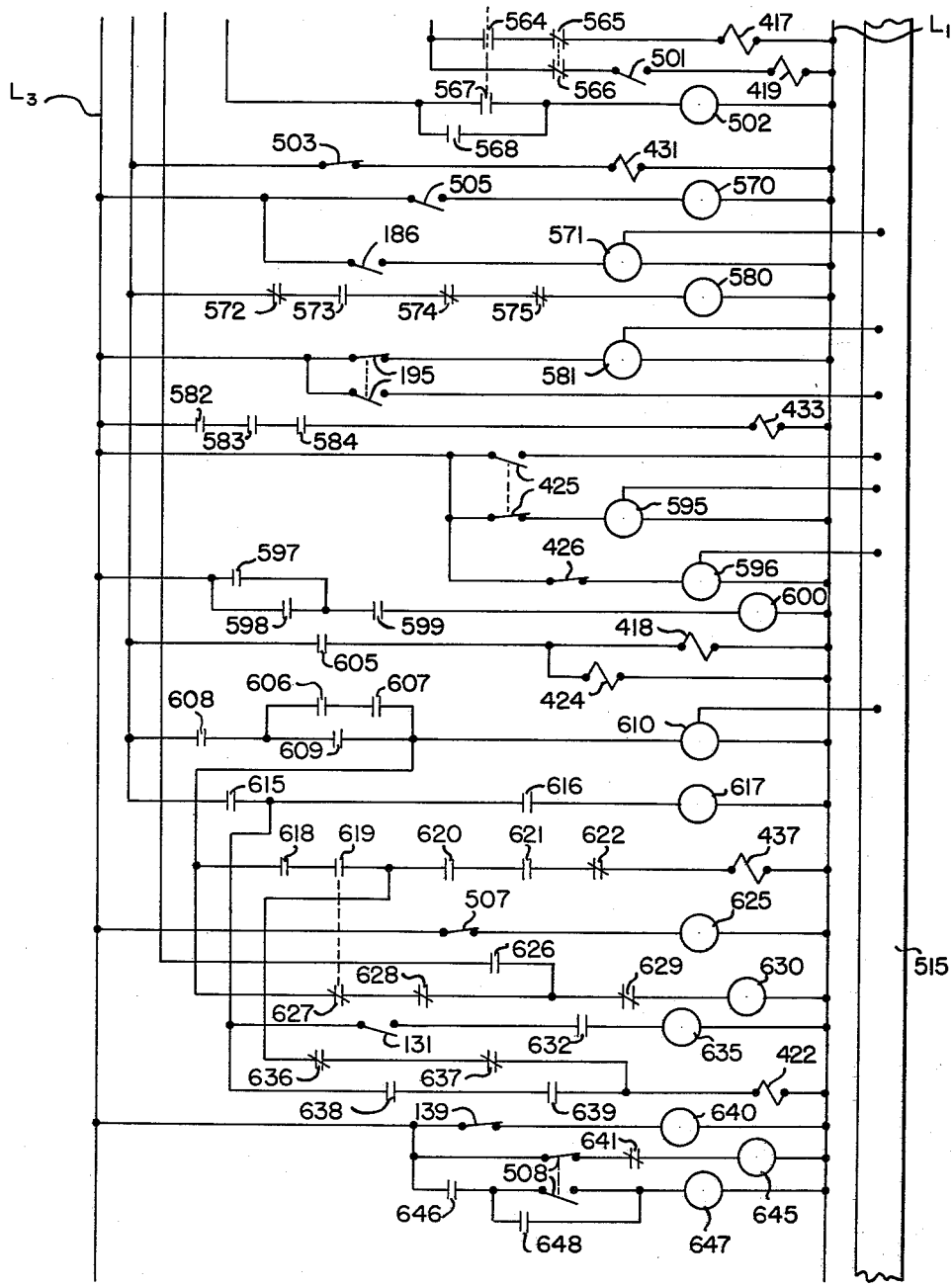
Figure 27C:
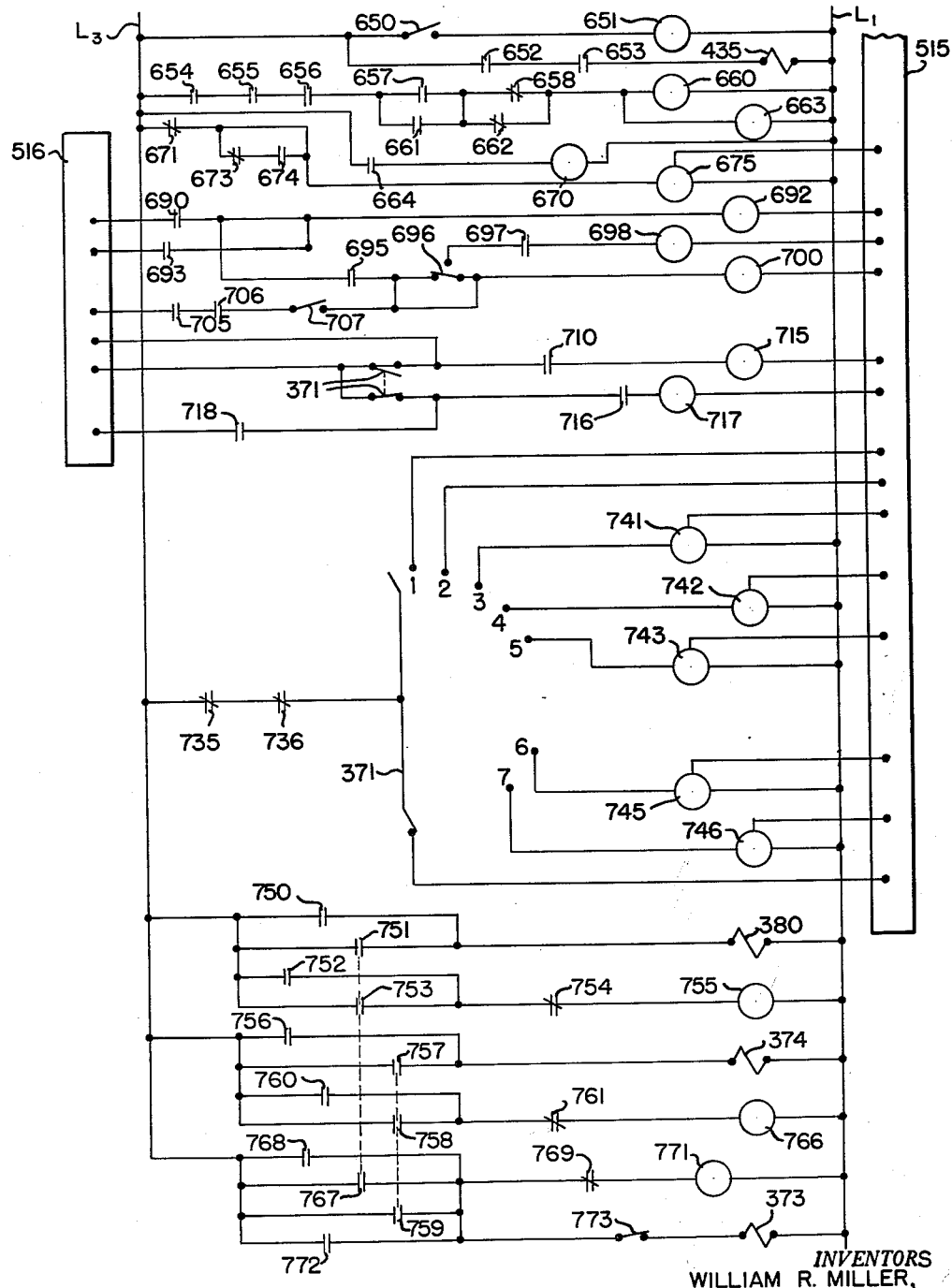

FIGS. 27A, 27B and 27C together constitute an electrical diagram showing one way in which the machine may be wired to accomplish its purpose.

In the illustrated embodiment of the invention, the axle, which is to be machined, is positioned between the centers carried by right and left spindle heads, respectively. When the axle is in position, the right hand head is moved toward the left hand head until the axle is held between the centers under a predetermined pressure. Then template mounts or carriers, one for each end of the axle, are automatically swung forward and down into position to cause sensing members or probes, which are carried by these mounts, to sense the areas of the axle which are to be machined. Each set of sensing members or probes is mounted on a base or slide that is moved radially toward the axle to a limit position until a stop, that is carried by the base or slide, engages the axle. Each set of probes comprises four probe members which are arranged in two pairs. The two probes of each pair are movable toward and away from one another axially of the axle. Two of these probes are adapted to engage the end shoulder at one end of the axle and the radius or fillet at the juncture of the bearing fit or journal and of the dust guard fit, and are automatically moved apart until they engage both these parts of the axle. The other two probes are adapted to engage the radius or fillet at the juncture of the dust guard fit and the wheel fit, and the radius or fillet at the juncture of the wheel fit and the main body of the axle, respectively; and they are moved apart until both are stopped by engagement with their respective radii or fillets.

Secured to each of the probes is a removable template which is intended to control the machining of that portion of the axle which is engaged by the probe.

After the probes have sensed their respective portions of the axle, the template carriers are automatically moved out of engagement with the axle, carrying the templates into position to be engaged by tracers. When they reach this position, the motors, which rotate the centers, on which the axle is mounted, and the feed drives for the carriages and cross slides of the lathe are put into operation. The tracers are mounted on the cross slides which also carry the tools so that as the work rotates, the tracers will follow the templates and cause the tools to produce the desired shape on the work.

There are two sets of tools, one for each end of the axle; and there are three tools in each set. For facing the shoulders at either end of the axle and for turning the bearing fit or journal, and the radius, which connects the bearing fit with the dust guard fit of the axle, one tool is used. When this tool has completed its operation, it is moved out of cutting position, and a second tool is moved into cutting position to machine the dust guard fit. Then this second tool is withdrawn from cutting position; and a third tool is moved into cutting position to machine the radius or fillet connecting the dust guard fit with the wheel fit, and to machine the wheel fit itself. Since the bearing, dust guard and wheel fits, are relatively long surfaces, it has been found preferable to disconnect the tracing mechanism during the turning of these areas, and allow the tools simply to move axially. Thereby smooth surfaces can be turned on these areas.

After the machining operations have been completed, the movements of the carriages and of the cross slides are stopped as is also the rotation of the work. An elevator is then raised beneath the axle to support the same, the centers are withdrawn from the axle, the elevator is raised to lift the axle up and to dump it onto a conveyor by which, for instance, it may be carried to an assembly area for assembling the wheels on the axle.

Referring now to the drawings by numerals of reference, 40 (FIGS. 1 and 2) denotes the bed of the machine. Mounted upon the bed 40 is a left hand spindle head 41 and a right hand spindle head 42. The axle A, which is to be turned, is mounted between the centers carried by these heads, as will be described later.

Secured to the bed 40 to project upwardly therefrom at one side thereof is a bracket 45. Pivotally mounted at one end on the head 41 by means of a pivot pin 48 (FIGS. 1 and 6), and at its opposite end on the bracket 45 by means of a pivot pin 49 is a beam or support 46 which carries the templates for controlling the shape to be turned on the axle at one end thereof. Pivotally mounted at one end on the head 42 (FIG. 1) by means of the pivot pin 50 and at its opposite end on the bracket 45 by means of the rod 49 is a support 47 which carries the templates for controlling the shape to be turned on the axle at its opposite end.

Figure 2:
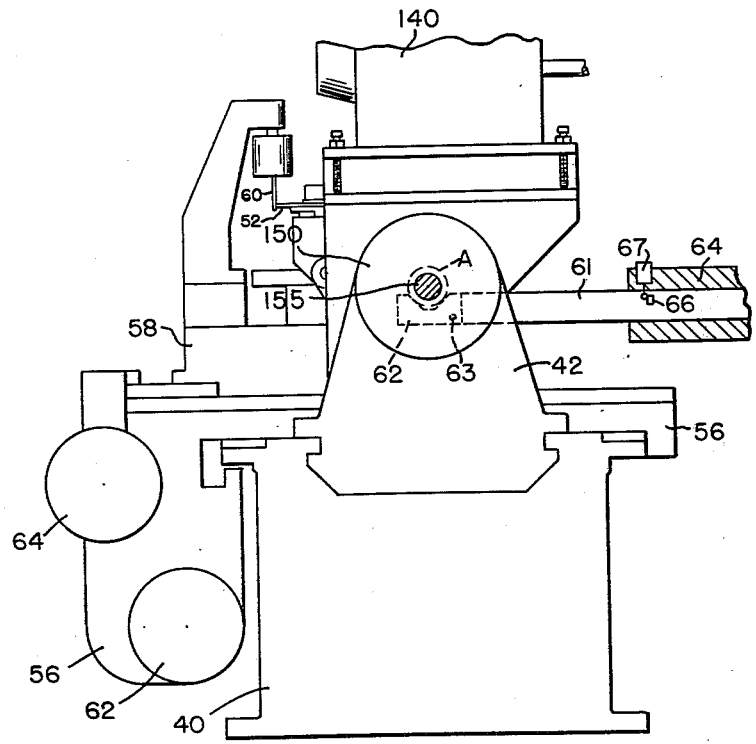
FIG. 2 is a section on a somewhat enlarged scale taken on the line 2—2 of FIG. 1 looking in the direction of the arrows.

Reciprocable on the bed 40 are carriages 55 and 56 (FIGS. 1 and 2). These carry the cross slides 57 and 58, respectively, on which the tools for turning the axle at its opposite ends, respectively, are mounted, and on which are also mounted the tracers 59 and 60 which engage the two sets of templates 51 and 52, respectively, to control the tool operations.

The axles are delivered to the machine by an arm 61' (FIG. 2). This arm may receive the axle from a conveyor. It has a holding portion 62' at its inner end which is pivoted at 63' on the arm and which is recessed to receive and hold the axle. It carries the axle from the conveyor forward into line with the centers of the machine. It may slide in a guide or support 64'. It carries a trip 66 which, when the arm is at the inner limit of its stroke, trips a limit switch 67 to cause the centers to grip and center the work as will be described further hereinafter. An elevator, designated as a whole at 70 (FIGS. 1, 20, 21, 22 and 24), is provided to lift the axles from between the machine centers, when the machining operations on the axle have been completed. The elevator carries the workpiece up to rails 65 (FIG. 23) and dumps the workpiece onto these rails for conveyance away.

Figure 23:
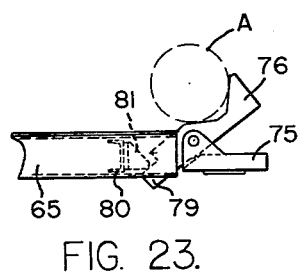
FIG. 23 is a fragmentary view taken in the same plane as FIG. 22 and showing how the elevator head is tipped to roll the work onto a rail or conveyor when the elevator reaches its uppermost position.

The elevator comprises a cylinder 71 which extends through the bed 40 of the machine and into the floor or machine foundation. There is a piston 72 reciprocable in this cylinder 71, which has a piston rod 73 secured thereto that extends through the upper end wall of the cylinder. Fastened to the upper end of the piston rod to travel therewith is a head 74, which carries at opposite ends blocks 75, which may be mounted to swivel in the head 74 about vertical axes and in each of which is pivotally mounted a jaw member 76. These jaw members have aligned V-shaped recesses 77 to receive the axle. These jaw members are pivoted by means of pins 78 in the blocks 75. At least one of the jaw members 76 has an extension thereon denoted at 79. There is a cross-rail 80 secured between the conveyor rails 65 which has a bar 81 fastened thereto that is positioned to engage the tail or tails 79 of jaw or jaws 76 to tilt the jaws 76 to dump the axle onto the rails 65 when the elevator is raised as shown in FIG. 23.

The cylinder 71 is supported by means of a collar 84 (FIG. 21) from the bed 40 of the machine. The piston rod 73 passes through a plate 95 which is secured on the bed 40. There is a limit switch 86 mounted on this plate which is adapted to be tripped by head 74 when the piston rod 73 is in its lowermost position. The switch 86, when tripped, stops the elevator at the completion of the cycle. Liquid or air may be supplied to opposite ends of the cylinder to raise or lower the piston 72 through ducts 89 and 90. To prevent the double-armed member 74 from turning during raising or lowering of the piston rod 73, there is a rod 92 (FIG. 22) secured to this double-armed member which slides through a guide opening in a projection 94 of the plate 95.

The left hand head 41 is adjustable on the bed of the machine on ways 100 (FIG. 5) by means of the screw 101 which is journaled in the bed 40 and which threads through a nut 102 that is doweled or otherwise fastened to the head 41. Journaled on anti-friction bearings 103 and 104 in the head 41 is a spindle 105. Interposed between a shoulder 106 on this spindle and a shoulder 107 on the head is an anti-friction thrust bearing 108. The spindle is adapted to be driven from a motor 110 through a pulley and belt drive (not shown), a worm 112, and a worm wheel 113. The worm wheel is keyed to the spindle.

Mounted centrally within this spindle is a center 115 which is adapted to engage at one end in a centering hole formed in the left end of the axle A. The center is of reduced diameter for the major portion of its length and at its outer end is secured in a sleeve 116 which is journaled by means of an anti-friction thrust bearing 117 in a cup-shaped member 118. Member 118 is reciprocable in a sleeve member 119 which is bolted or otherwise fastened to the head 41.

The member 118 is adapted to be reciprocated by a piston 123 (FIG. 25) which is reciprocable in a cylinder 120. This piston is connected to a piston rod 121 which has an enlarged head 122 at its inner end that is fastened by screws or other suitable means to the reciprocable member 118.

The piston rod 121 and sleeve 118 are used to retract the center 115 while the axle A is being placed in or removed from the machine.

Figure 3:
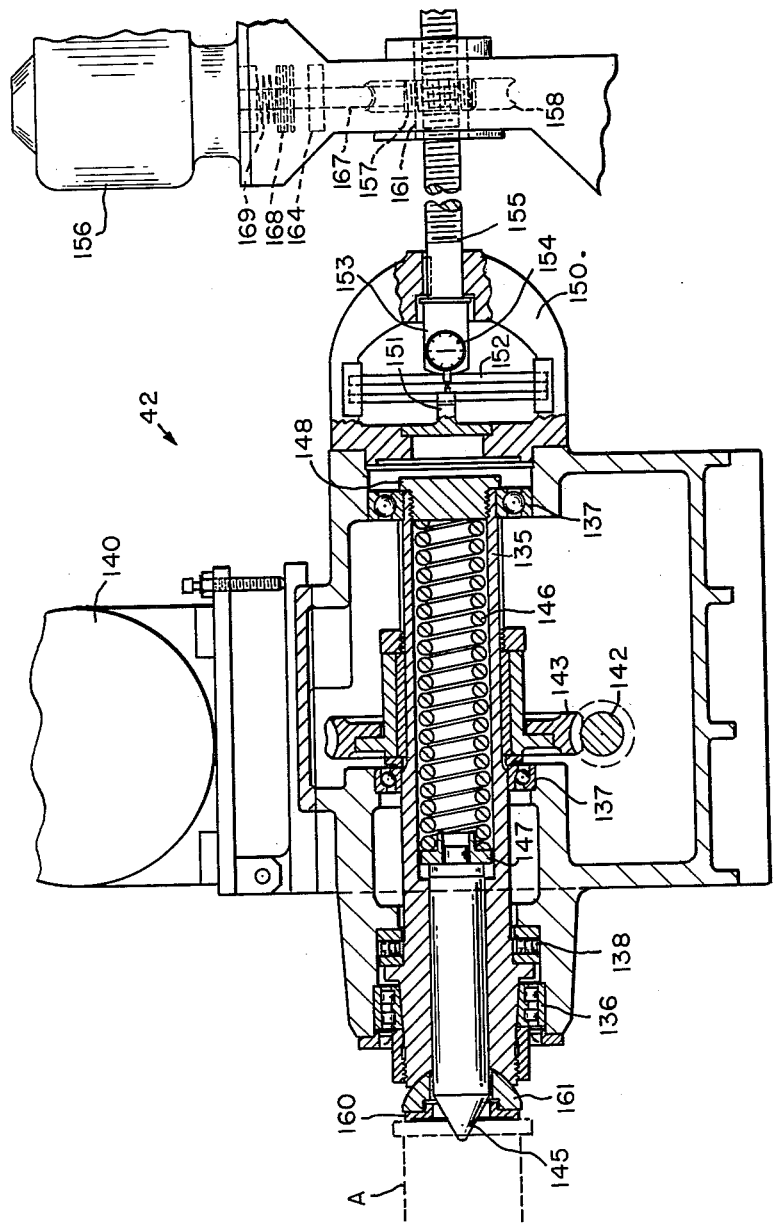
FIG. 3 is a part side elevation, part axial section of the right spindle head of the machine.
Figure 21:
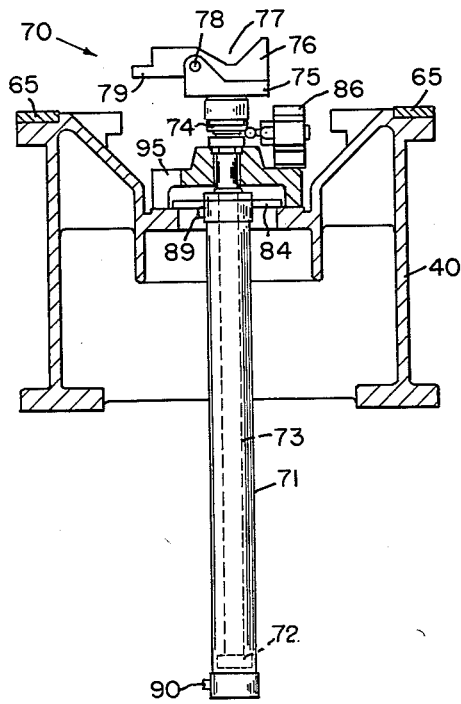
FIG. 21 is a vertical section through the bed of the machine showing the elevator for raising the work upon completion of operations thereon.
Figure 22:
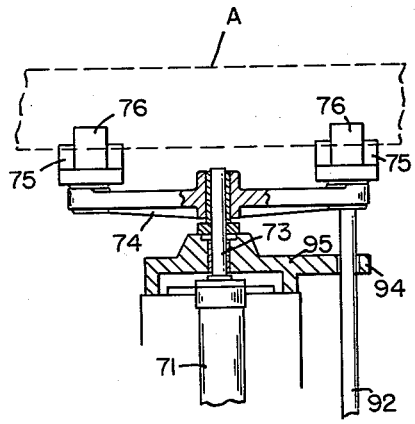
FIG. 22 is a part view, part section, taken at right angles to the view of FIG. 21.

A limit switch 131 (FIG. 5) is mounted on the bracket 119 to be operated by a trip member 132. This trip member is slidable in a hole in the bracket that extends radially of piston 123. When trip member 132 is riding on the peripheral surface of the sleeve 118, the limit switch is open. When the trip member drops into the recess 133 in the sleeve, at the inner limit of movement of the sleeve, the limit switch closes permitting operation of the arm 61' (FIG. 2) or elevator 70 (FIG. 21). A second limit switch 139 is mounted on bracket 119. It is tripped by trip member 134 also slidable in a hole in sleeve 118. When the sleeve is in the position shown in FIG. 5, the trip member 134 projects into a recess 141 in the sleeve 118 and limit switch 139 is closed, permitting swing of the probes into sensing position. As the sleeve moves forward, trip member 134 rides out of the recess 141 and onto the periphery of the sleeve, opening limit switch 139, opening the circuit to motor 110 and motor 140 (FIG. 3).

The axle, which is to be machined, is adapted to be seated at its left hand end against a seating member 125 which surrounds the inner end of the center 115. Seating member 125 is fastened to a seating member 126 which has a convex spherical surface 127 seating on a corresponding concave spherical surface at the front end of the spindle 105. The spherical seating surfaces permit of chucking the axle even though either end surface of the axle be somewhat out of square.

The center 115 is constantly urged toward engagement with the axle by coil spring 124 which surrounds the reduced diameter portion of the center and which is interposed between a collar 127 and a nut 128. Collar 127 seats against the shoulder formed at the juncture of the reduced and large diameter portions of the center. Nut 128 threads into the rear end of spindle 105. From the above it will be seen that the axle can depress the spring-loaded center 115, and in turn exert a large axial force against the spherically seated thrust shoe 125.

To take up excess slack in the belt drive to worm 112 the base of motor 110 is pivotally mounted by means of a pin 129 on top of the head 41 and is adjusted about this pivot pin by screws 130 which thread through the motor base and engage the upper face of the head or of the sub-base on which the motor base is mounted.

The right hand head 42 is quite similar to the left hand head. It has a spindle 135 (FIG. 3) journaled in it on anti-friction bearings 136 and 137; and the spindle is held against movement relative to the head stock 42 by an anti-friction thrust bearing 138. The spindle is adapted to be driven from a motor 140 through a pulley and belt drive (not shown), the worm 142 and a worm wheel 143. The worm wheel 143 is keyed to the spindle.

Mounted in the spindle is a center 145 which is adapted to engage the right hand end of the axle A. The center is constantly urged toward engaging position by a coil spring 146 which is mounted within the spindle and is interposed between a nipple 147, that is mounted on the inner end of the center 145, and a cap member 148 which closes the outer end of the spindle.

Right hand head assembly, like the left hand head assembly, has a spherical seating member for the axle. This comprises a seat 160 which is secured to a spherical seating member 161 that has a convex spherical surface at its back seating in a concave corresponding spherical surface in the spindle 135.

Figure 4:
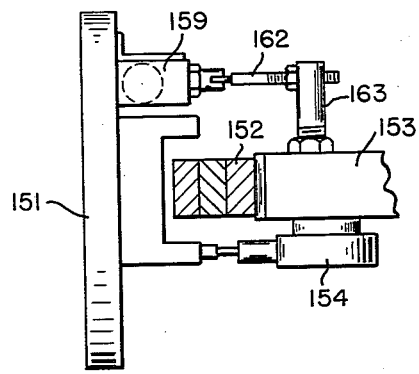
FIG. 4 is a fragmentary horizontal section on a somewhat enlarged scale showing the mountings for the gauge and limit switch carried by this head, and associated parts.

The right hand head assembly differs from the left hand head assembly primarily in a pusher assembly which is attached to the right hand end of the head 42. This comprises a yoke member 150 (FIGS. 3 and 4) which is bolted to the head 42 or secured thereto in any other suitable manner. Fastened to this yoke member by screws or in any other suitable manner is a block 151. This block is bifurcated at its right hand end and straddles one of three leaf springs 152 that are disposed vertically and are secured at opposite ends in the yoke 150.

Slidably mounted in the yoke member 150 and keyed against rotation relative thereto is a screw shaft 155. This screw shaft is adapted to be driven from a motor 156 through a worm 157, and worm wheel 158. The worm wheel is keyed to a nut 149 through which the screw shaft threads. Rotation of the worm wheel 158 advances or retracts a block or anvil 153, which is secured to the left hand end of the screw shaft and which bears against the right hand leaf spring of the three leaf springs 152 that are secured in the yoke 150. This, in turn, will advance or retract the right hand head and in addition, when in contact with an axle, regardless of length, exert a specific axial force for aligning the axles on centers and for friction drive through the spherically seated thrust shoes 125 (FIG. 5) and 160 (FIG. 3). The worm wheel is driven from the motor 156, to effect the advance of the right hand head, through a disc clutch 168, which is constantly urged toward engaged position by spring 169, and shaft 167, to which the worm 157 is secured. When the axle is held under a specific pressure, the disc clutch slips. The worm wheel is driven positively in the opposite direction, to retract the head 42 from motor 156, through a one-way overrunning clutch 164, shaft 167 and worm 157.

The specific force or pressure mentioned is produced by the curved end of anvil 153 pressing against the springs 152 and deflecting these springs a definite part of an inch.

The specific force pressing on the axle can be accurately controlled by use of a conventional dial gauge 154 (FIGS. 3 and 4) and a limit switch 159. Dial gauge 154 is mounted on anvil 153 at one side thereof; and limit switch 159 is mounted on block 151 to be engaged and tripped by pin 162 when the desired force is exerted on the axle. Pin 162 is threadably adjustable in a stud 163 that is carried by anvil 153. Limit switch 159, when tripped, stops motor 156.

As will be noted from FIG. 1, the pin 49, on which the template carriers 46 and 47 swivel, extends to the right of bracket 45 a greater distance than to the left of the bracket. The purpose of this extra length is to allow the right hand template carrier to move from right to left or from left to right, as the case may be, as the right hand head 42 is moved by the pusher screw 155, anvil 153 and springs 152. By this means, therefore, the two template setting mechanisms are always in proper relationship to the length of the axle, and adjustment for the length of the axle is made automatically even when axles of different lengths are received in random fashion at the axle lathe.

Figure 6:
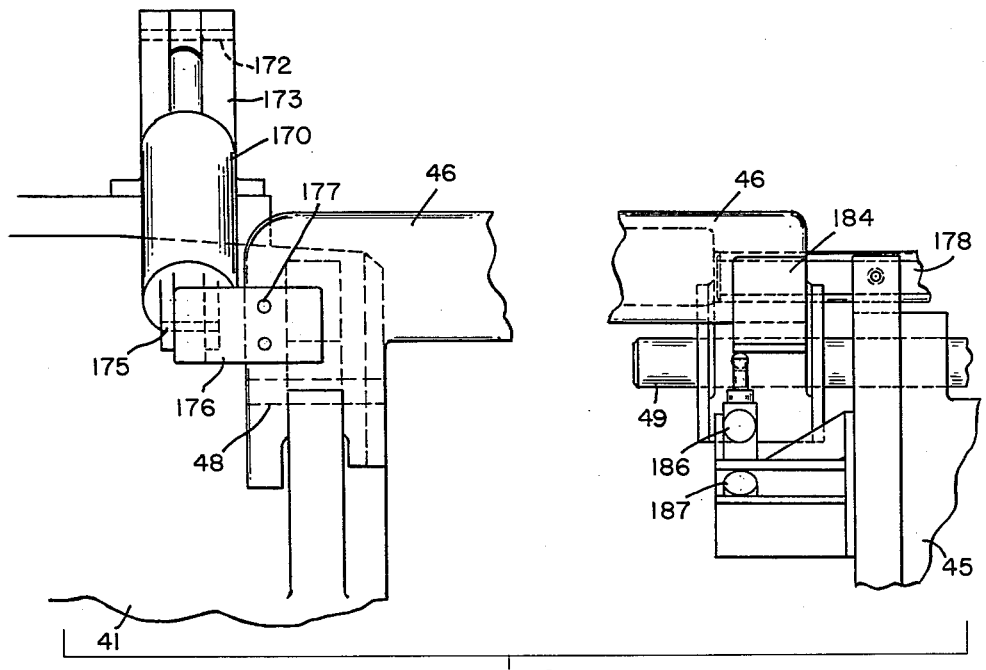
FIG. 6 is a fragmentary view, on an enlarged scale, as compared with FIG. 1, showing the mounting for the left hand set of templates of the machine.
Figure 7:
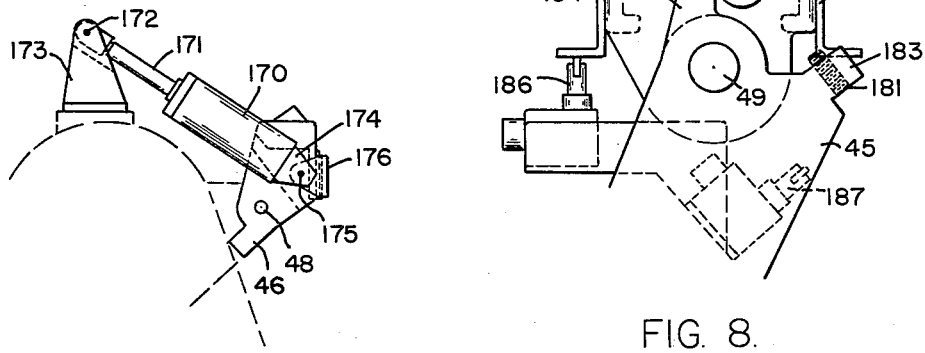
FIG. 7 is a left hand end elevation on a reduced scale of this mounting.

The limit switch 159 not only stops motor 156 but also closes a circuit to a solenoid 165 (FIG. 25) which shifts the valve 166 that controls the direction of the movement of pistons 179, 179' (FIG. 25) in hydraulic cylinders 170, 170' (FIGS. 1, 6 and 7). This causes the template carriers 46 and 47 to be swung down to bring the probes, that are mounted on the template carriers, into engagement with the axle. The two template setting mechanisms are alike, their difference only being in that one is right hand and the other left hand. Therefore, only one will be described in detail hereafter.

The bracket or carrier 46, as previously stated, is pivotally mounted on the head 41 and bracket 45 by means of a pin 48 and bar 49. The support or carrier 46 is adapted to be swung about its pivots in opposite directions by application of hydraulic fluid to opposite ends of the piston 179 which reciprocates in the cylinder 170 (FIGS. 1, 6 and 7). The piston has a rod 171 secured thereto which projects at one end through one end wall of the cylinder 170 and is pivotally connected by means of the pin 172 to a bracket 173 which is secured on top of the head 41. The cylinder itself has a lug 174 integral therewith and secured thereto, which is pivotally connected by means of a pin 175 with a bracket 176 that is fastened by means of screws 177 to the template carrier 46.

Figure 8:
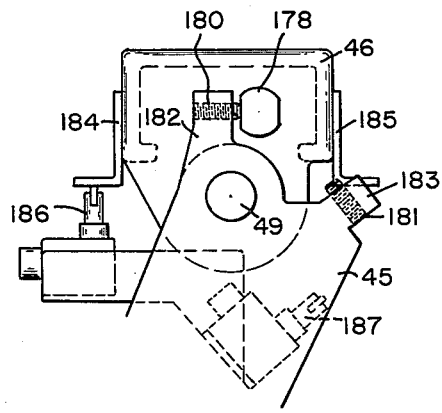
FIG. 8 is a right hand end elevation on the same scale as FIG. 7 of this mounting showing in full and in dotted lines, respectively, the two limit positions of swing of the template bracket.

Swinging movement of the template carrier 46 is limited in opposite directions by engagement of the bar 178, which is splined to swing with the template carrier, with one or other of two adjustable stops 180 and 181 (FIGS. 6 and 8). The bar 178 is slabbed off on opposite sides, as shown in FIG. 8; and the stops 180 and 181, respectively, engage these slabbed off portions of the bar. Stops 180 and 181 are threaded, respectively, into lugs 182 and 183, respectively, that are integral with, or secured to, the bracket 45. Fastened to the carrier 46 at opposite sides thereof are two L-shaped angle brackets 184 and 185. These are adapted, respectively, to trip two limit switches 186 and 187. The limit switch 187, when tripped, starts the probing cycle of the machine.

Figure 20:
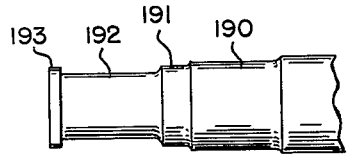
FIG. 20 is a fragmentary side elevation of an axle such as may be turned on a machine built according to the illustrated embodiment of the invention.

A typical axle, such as is to be operated on the machine of the present invention, is shown fragmentarily in FIG. 20, only the left hand end portion of the axle being shown. This portion has a wheel bearing portion denoted at 190, a dust guard section 191, and a bearing fit section 192. A button or shoulder 193 is provided at the extreme end of the axle.

Mounted on the carrier 46 and doweled thereto is a block 200 (FIG. 14), which has a smooth top surface for a portion of its length and a serrated top surface for the remainder of its length. Secured to the carrier 46 is bracket 201 in which there is fastened the rod 202 of a piston 203 which reciprocates in a cylinder 205 formed in a slide 204. Slidably mounted on the slide 204 is a slide 206. This slide 206 can move with slide 204 and relative thereto. When slide 206 is moving with slide 204, it slides on the upper smooth surface portion of the block 200 and on the carrier 46. When slide 206 moves relative to slide 204 it is guided by slide 204 and by rods 212, which are fixed at their inner forward ends to slide 206 and which have portions of reduced diameter which slide through holes in the end plate 213 of the cylinder 205. Adjustably mounted on the slide 206 is an adjustable stop 207.

Figure 13:
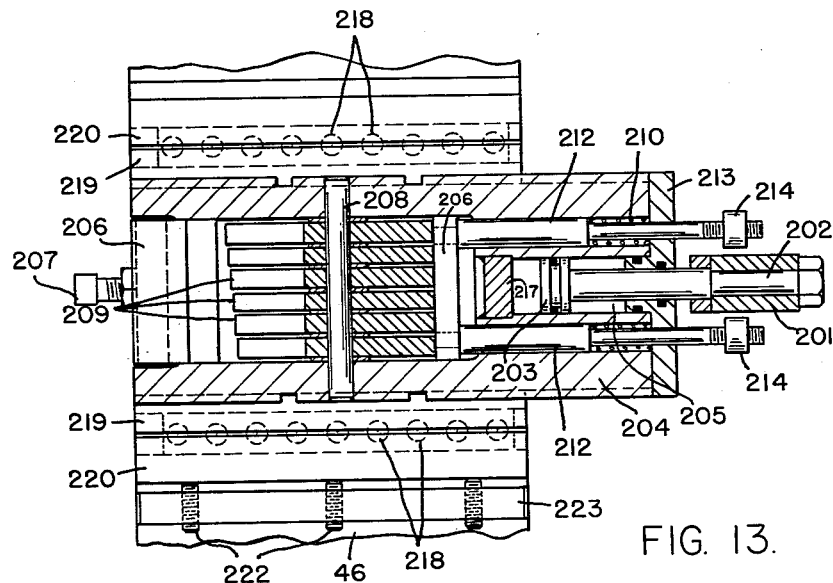
FIG. 13 is a section on the line 13—13 of FIG. 14.

Pivotally mounted in the slide 204 to rock on a pin 208 are a plurality of pawls 209 (FIGS. 13 and 14), which are adapted to engage in the notches 210 of the serrated plate 200. These pawls are of different lengths forward from their common pivot pin 208; and their lengths are so selected that only one will engage at a time in one of the notches 210.

The slide 206 is constantly urged forward (to the left in FIG. 14), relative to slide 204 by the coil springs 210. These are interposed between the enlarged headed portions of rods 212 and the end plate 213 of the cylinder. Nuts 214, which thread on the outer ends of the rods, limit their inward, forward movement.

The slide 206 is shaped with a shoulder 215 that is adapted to engage the tails of the pawls 209, and that holds the pawls or fingers 209 disengaged when the slide 206 is in forward position relative to plate 204. A leaf spring 216, which also engages the tails of the pawls 209, constantly urges these pawls in a counterclockwise direction about the pivot pin 208 to constantly urge them toward engagement with the notches 210 of the block 200.

Figure 14:
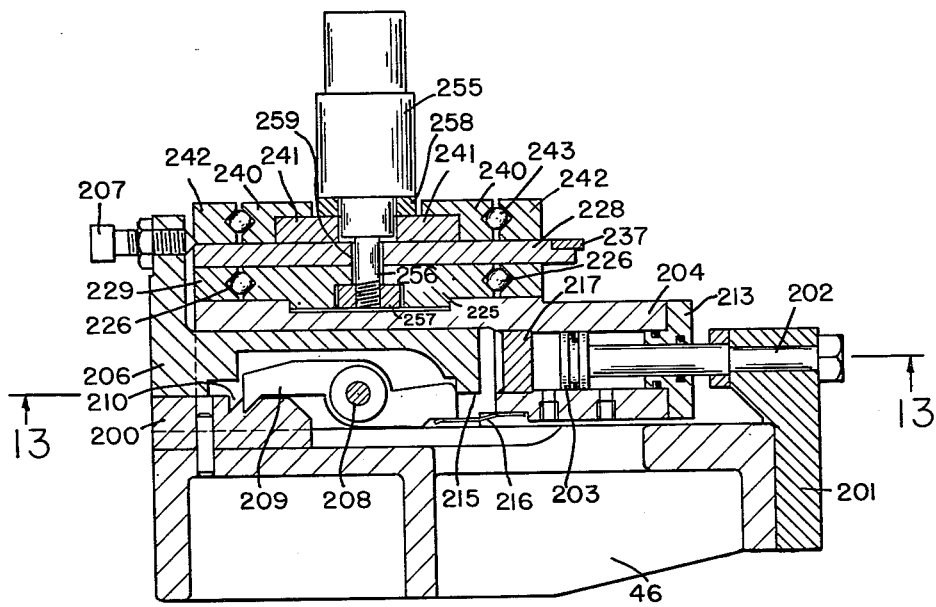
FIG. 14 is a section on the line 14—14 of FIG. 10, looking in the direction of the arrows.

When hydraulic fluid is admitted to the cylinder 205 between the piston 203 and the plate 213, the slide 204 is moved to the right in FIG. 14, and by means of pivot pin 208 will move the pawls 209 to the right. Motion of pawls 209 to the right, relative to block 200, will cause the pawls 209 to rotate about the pivot pin 208 in a clockwise direction and the tails of the pawls 209 will be positioned to engage the shoulder 215 of slide 206.

Slide 206 is constantly urged to the left relative to slide 204 by springs 210 until nuts 214 engage plate 213. When hydraulic fluid is admitted to the cylinder 205 between the inner face of the piston 203 and the end wall 217 of the cylinder, the slide 204 is moved to the left in FIG. 14 to bring the stop 207 into engagement with the axle A as shown in FIG. 10. During this movement, the pawls or fingers 209 will be held out of engagement with notches 210 in block 200 by the shoulder 215 of slide 206. When the stop 207 contacts the axle, however, the hydraulic pressure will force the slide 204 to continue motion to the left, resulting in relative motion of slide 206 to the right relative to slide 204. The fingers or pawls 209 will clear the shoulder 215; and one or more of the fingers 209 will drop into the nearest notch 210. As stated, these fingers are all of different effective lengths; they may vary from one another in length different amounts in accordance with the variation in diameters of different standard bearing shells or races. Of those fingers which drop into the notch, the one finger, which is closest to the vertical portion of notch, will determine the extent which the slide 204 can move forward (to the left in FIG. 14) by reason of the fluid pressure in the cylinder 205. Thus, the templates, which control removal of stock from the bearing fit section of the axle, will be adjusted, as will hereinafter appear, so that this section of the axle will be machined to a diameter suitable for receiving one of a predetermined number of different diameter bearing shells or races.

The reciprocating movement of the slide 204 is made as frictionless as possible by use of anti-friction bearings 218, which roll in mating races 219 and 220 provided at opposite sides of the slide and secured to the slide and to the carrier 46, respectively. Screws 222, that thread into a bar 223, which is fastened to the carrier 46, and which abut at their inner ends against the race 220, permit adjusting the desired load on the bearings.

Mounted on top of the slide 204 to slide longitudinally thereon is a rectangular plate 225, opposite ends of which are denoted at 224 and 227, respectively (FIGS. 11 and 14); and opposite sides of which are provided with raceways for the balls 226. There is a depression in the slide 204; and a tongue formed on the bottom of plate 225 engages in this depression, as shown clearly in FIG. 14.

A plate 228 is disposed on top of the plate 225. It has raceways 229 secured beneath it which are opposed to the raceways along the edges of the plate 225, and in which the balls 226 roll.

Secured to the forward raceway 229 is a probe 235 (FIGS. 10 and 11) which has a rounded convex surface 236 adapted to fit the fillet curve connecting the bearing section 192 of the axle with the dust guard portion 191 of the axle. Removably secured on the rear raceway 229 is a template 237. This template has a rounded concave surface 238, ordinarily complementary to surface 236, which controls through tracer 59, as will be described further hereinafter, the shape to be turned on the axle.

Mounted on top of the plate 228 (FIG. 14) is a plate 241 to which are secured raceways 240 which cooperate with the raceways 242, that are secured to the plate 228, as runways for the balls 243. Screws 244 (FIG. 10), which thread through two blocks 249 that are secured to plate 228 and probe 235, respectively, and which engage raceway 242, serve to control the load on the bearings 243. Plate 241 carries the probe 245 (FIGS. 10 and 11) which is shaped to engage the shoulder formed at the juncture of the button 193 and the bearing portion 192 of the axle. This plate 241 also has removably fastened to it a template 247 on which the stylus or tracer 59 travels to control the shape produced on the button portion of the axle and at the juncture of the button portion and the bearing portion 192. Probe 245 has a plane surface 246 which is adapted to engage against the shoulder of the axle; and template 247 has a plane surface 248 aligned with surface 246 and against which the stylus of the tracer engages to control the shape turned on the axle.

A piston 239 (FIG. 26), which reciprocates in the cylinder 250 (FIG. 10) serves, when compressed air is applied between the piston and the left hand end of the cylinder, to move the probes 245 and 235 apart to bring the probes into abutting relation with the respective portions of the axle which they are intended to engage, as shown in FIG. 10. The piston rod 251, which is connected to this piston, has threaded engagement with a lug 252 which is integral with a plate 253 that is fastened by screws to the plate 241. The cylinder itself is secured by screws to the plate 228. A stop block 254 is secured to the carrier 46 to limit the movement of the cylinder 250 away from the piston rod. This stop block is positioned to engage the cylinder.

To lock the probes 235 and 245 and the templates 237 and 247, which are secured thereto, in position after the probes have engaged the fillet curve 249 (FIG. 10) and plane shoulder surface 253, respectively, locking plates 258 (FIG. 14) and 257 are provided. Plate 257 is fastened to the threaded lower end of a piston rod 256 which is secured to a piston 269 (FIG. 26) that reciprocates on a cylinder 255. Cylinder 255 has a clamping plate 258 secured to it which engages against the upper face of plate 241. When pressure fluid is supplied between the lower end of cylinder 255 and the lower end face of the piston that reciprocates thereon, clamping plate 257 is forced upwardly into clamping engagement with plate 225 and clamping plate 258 is forced downwardly into clamping engagement with plate 241. By applying the pressure fluid between the upper end of the cylinder and the upper end face of the piston the clamping plates are released.

Piston rod 256 extends through aligned elongate slots 259 (FIGS. 11 and 14) in plates 241 and 228 to permit sliding movement of these plates relative to one another.

Figure 9:
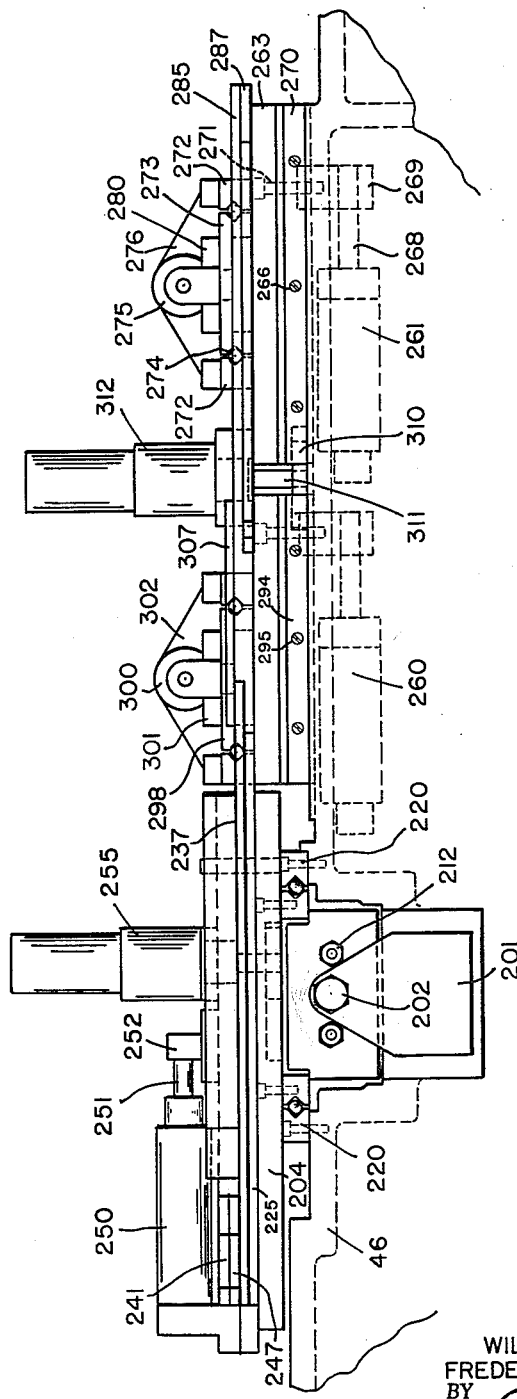
FIG. 9 is a side view of the template assembly, but with the control nubs removed.

Mounted on the carrier 46 at the right hand end thereof are two air cylinders 260 and 261 (FIG. 9).

Raceways 263 (FIGS. 11 and 15) are secured to the carrier 46 which cooperate with raceways 264 and balls 265 to provide an anti-friction sliding mounting for a slide 267. The load on the bearings 265 can be adjusted by screws 266 (FIG. 9) which engage one of the raceways 263 and which thread into a bar 270 that is fastened to carrier 46.

There is a piston 231 (FIG. 26) reciprocable in the cylinder 261. This piston is connected by piston rod 268 (FIG. 9), a block 269, and screws 271 to the slide 267.

Figure 15:
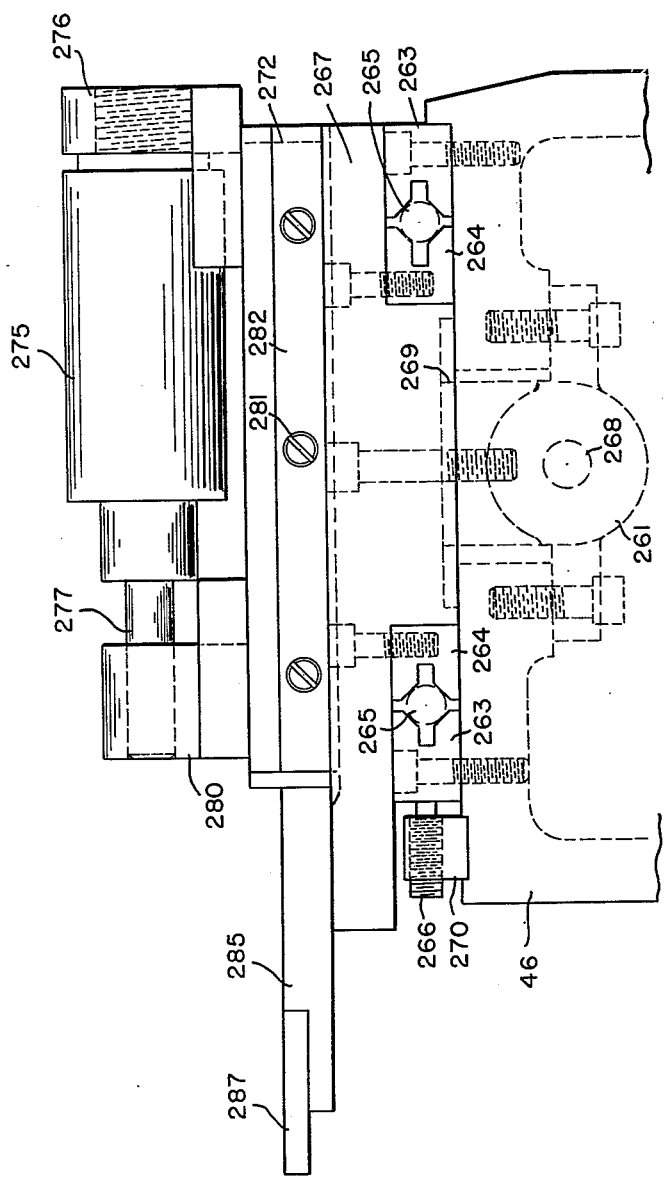
FIG. 15 is an end view of the template carrier and associated parts on a somewhat enlarged scale, looking from the right in FIG. 10.
Figure 26:
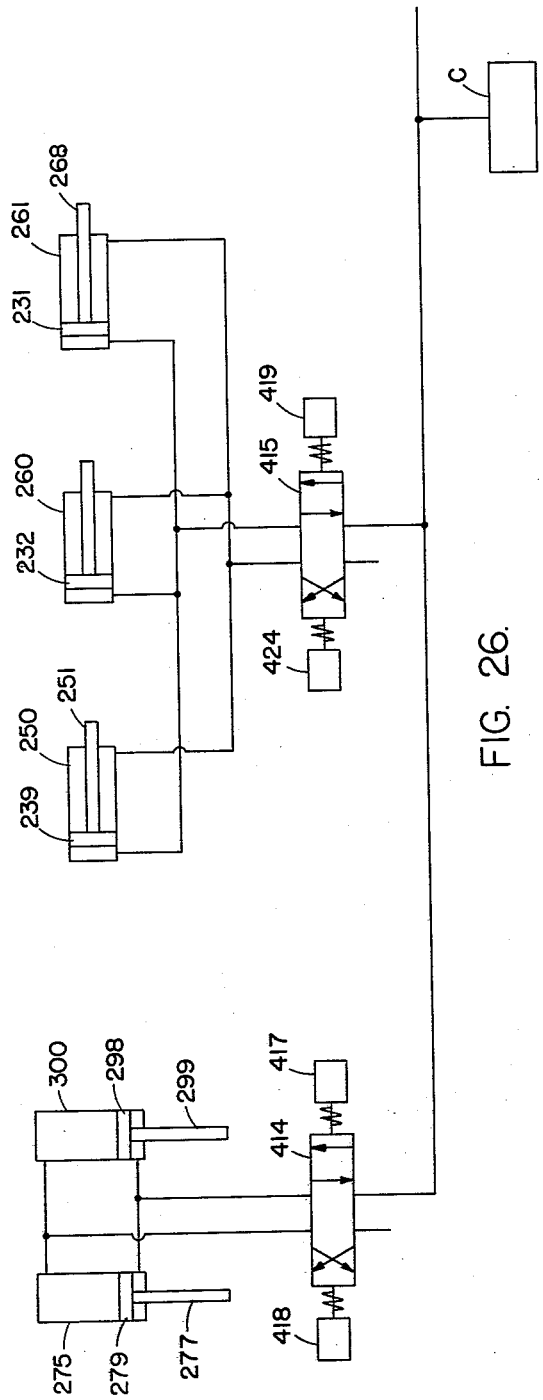
FIG. 26 is a diagram illustrating the pneumatic circuitry of the machine.
Figure 24:
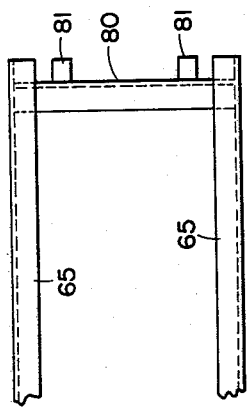
FIG. 24 is a fragmentary plan view of the conveyor rails onto which the elevator tips the workpiece.

Secured to the slide 267 are parallel raceways 272 (FIGS. 9 and 10) which extend transversely of the direction of movement of slide 267 and which cooperate with parallel raceways on a pair of plates 273 and with balls 274. Secured to the plates 272 by a yoke member 276 is an air cylinder 275 (FIGS. 9, 10 and 15). Reciprocable in this cylinder is a piston 279 (FIG. 26). The piston has a piston rod 277 secured to it, which is connected by a yoke 280 with the plates 273. Screws 281, that thread into a bar 282, serve to adjust the load on the balls 274. Bar 282 is fastened to slide 267.

The plates 273 are fastened to a generally T-shaped member 285, (FIGS. 10 and 11) which lies between plates 273 and slide 267, and one end of which forms a probe 286 that is adapted to engage the fillet portion 288 of the axle at the juncture of wheel bearing portion 190 and the central portion 194 of the axle. At its rear end this T-shaped member has the template 287 removably secured thereto, which controls the fillet curve produced at the juncture of the wheel bearing portion and the central portion of the axle and the shape of the wheel bearing portion. The probe 286 has a curved surface 289 which generally matches the fillet curve 288. The template 287 has a curved portion 290 which controls the fillet curve to be machined on the axle; and it has a straight surface 291 which controls the lengthwise shape of the wheel bearing portion 190 of the axle.

A piston 232 (FIG. 26), which reciprocates in the cylinder 260 (FIG. 9) is connected, in a manner similar to the connection of the piston rod 268, to a slide 292 (FIGS. 10 and 11) which reciprocates longitudinally on the carrier 46 in alignment with slide 267 toward and from slide 267. Slide 292 is guided by anti-friction bearings 293 (FIG. 11) in a manner similar to the slide 267. Bar 294 (FIG. 9), wihch is fastened to the carrier, has screws 295 threaded into it for adjusting the load on this bearing.

A piston 298 (FIG. 26), which reciprocates in an air cylinder 300, (FIGS. 9 and 10) is connected by a piston rod 299 and a yoke 301 with the inner raceways 298 for ball bearings 297. A yoke 302 connects the cylinder 300 itself to the outer raceways 296 for these bearings. Screws 283 (FIG. 10), that thread into a bar 284, serve to adjust the load on these bearings. Bar 284 is fastened to slide 292. Secured to the cylinder 300 to reciprocate therewith is a generally L-shaped member 305 (FIG. 11), which has a probe 306 (FIGS. 10 and 11) at its front end adapted to engage the axle in the fillet 308 at the juncture of the dust guard surface 191 and the wheel bearing surface 190. To the rear end of this member 305 there is removably secured a template 307 which serves to control the shape turned on the axle for the dust guard and fillet section thereof as shown. The template 307 can overlap the template 287 and also the template 237.

Probe 306 has a curved portion 309 (FIG. 10) adapted to engage the fillet 308 of the axle. Template 307 has a generally correspondingly curved portion 314 which controls the fillet curve to be machined on dust guard section 191 of the axle; and template 307 has a straight line portion 315 controlling the machining of the rest of the dust guard section of the axle.

When the carrier 46 is in sensing position, the two air cylinders 275 and 300 (FIG. 10) are supplied with air through action of a conventional time relay whose coil is denoted at 500 (FIG. 27A) and whose contacts are denoted at 501 (FIG. 27B), forcing the two probes 286 and 306, to which they are attached, into engagement with the dust guard section 191 and the wheel fit section 190, respectively.

Immediately thereafter air is supplied to the cylinder 250 (FIG. 10) and to the cylinders 261 (FIG. 9) and 260. The stop 245 is thus moved against the left hand shoulder or button 193 of the axle while the radius 236 of the probe 235 is forced into the fillet 249 of the right hand end of the bearing fit section 192 of the axle. At the same time the probe 306 of the dust guard section 191 is moved to the right until the radius 309 of this probe engages the fillet 308 of the wheelfit section of the axle. At the same time, the probe 286 of the wheelfit section is caused to move to the right until the radius 289 of that probe engages the radius 288 on the wheel fit section 190. As the several probes move into engagement with their respective sections of the axle, the templates 247, 237, 307, and 287 are moved longitudinally relative to one another. The successive operations of moving the probes into engagement with the axle and of then translating them to engage them with the respective shoulders or fillet curves are effected in a time period controlled by the electrical timer 500—501.

When the operations of thus setting the probes 245 and 235 and of the associated templates 247 and 237 have been completed, the now adjusted probes and templates are clamped in position by operation of cylinder 255 (FIG. 14). After the probes 306 and 286 have moved into engagement with their respective parts of the axle, to thereby position the associated templates 307 and 287, the slides 267 and 292 (FIG. 10) are clamped in position. To this end, a clamping plate 310 (FIG. 9) is connected to a piston rod 311 that is secured to a piston 316 (FIG. 25) that reciprocates in a cylinder 312. Cylinder 312 has a second clamping plate secured to it, similar to plate 258 (FIG. 14), that operates through a clamp plate 313 (FIG. 10), similar to plate 241 (FIG. 14), to clamp the slides 267 and 292 (FIG. 10). A second conventional electrical timer whose coil is denoted at 502 (FIG. 27B) and whose contacts are denoted at 503 causes operation of the clamp plates.

After the probes and templates have been clamped to their respective carriers 46 and 47, fluid pressure is applied in the hydraulic cylinders 170 to swing the carriers 46 and 47 away from the axle to tracing position. As this happens, the hydraulic pressure in the cylinder 205 (FIGS. 13 and 14) continues to force the probe 235 for the bearing fit section toward the axle until the nearest one of the six fingers 209 is pushed solidly against the vertical surface of one of the notches 210 in the plate 200 preventing further motion toward the axle. Thereby one of the twelve standard diameters, to which the bearing fit section will be machined, is selected, the slide 206 being clamped by the engaged finger or pawl 209 in this portion.

When the carrier 46 swings up to horizontal, working position, arm 184 (FIG. 8) trips the limit switch 186 which starts the cycle of cutting operation of the machine.

There are three cutting tools 320, 322, 324 (FIGS. 16, 17 and 18) provided on each of the cross slides 57 and 58 illustrated in the drawings. One of these tools, the tool 320, is for machining the bearing fit 192 (FIGS. 10 and 20) and the radius 249 of the axle. Another tool 322 is for machining the dust guard surface 191; and the third 324 is for cutting the wheel fit section 190. Each of these tools may be in the form of a tungsten carbide bit mounted in a suitable holder.

The tool 320 is clamped to a plate 325 by an angular clamping member 326, and by clamping screws 328. Clamping member 326 is secured to the plate 325 by bolts 327 that pass through the clamping member 326 and thread into the plate 325. Clamping screws 328 thread through clamping member 326 and engage the top face of the tool 320. A plate 325 is bolted on each cross slide 57, 58 (FIGS. 1 and 16) which is adapted to be reciprocated by a conventional screw 323 (FIG. 19) and split nut 329. A split nut 329 is fastened to each cross slide 57, 58.

The cross slides 57 and 58, as already described, are reciprocable transversely on carriages 55 and 56 (FIGS. 1 and 2).

The carriage motors 61 and 62 (FIGS. 1 and 2) effect reciprocation of the two carriages 55 and 56, respectively. The feed screw 66 (FIG. 1) is fixedly secured at opposite ends to the bed 40 of the machine by brackets 67; and split nuts secured to the two carriages 55 and 56 are rotated around the feed screw by gearing (not shown) driven from motors 61 and 62, respectively, to effect movement of the carriages 55 and 56, respectively. The motors 61 and 62 may be reversible, and may be driven in opposite directions for feed and traverse, respectively, of the tools; or each motor may be geared to the associated split nut through a train of gearing which includes an idler gear that can be engaged or disengaged for feed and traverse, respectively, as will readily be understood by those skilled in the art.

The motor 63 (FIG. 1), which drives the cross-slide 57, may be geared as by a worm and worm wheel (not shown) to the screw 323 (FIG. 19) and nut 329 to actuate cross slide 57; and the motor 64 may be correspondingly geared to a corresponding screw that actuates cross slide 58.

The tools 322 and 324, respectively, are slidably mounted in a member 336 which is welded or otherwise secured to the plate 325.

The tool 320 is secured in fixed relation to plate 325 which in turn is fixedly secured to cross slide 57. Pistons 331 and 332 (FIG. 25), that are reciprocable in cylinders 337 and 340 (FIGS. 16 and 17), respectively, shift tools 322 and 324 forward and back relative to tool 320. The cylinders 337 and 340 are bolted or otherwise secured to the cross slide 57. The pistons are connected by piston rods 338, 341 (FIGS. 16, 17 and 19) with plates 339 and 342, respectively, which are secured by screws 343 to the tools 322 and 324, respectively.

The tools 322 and 324 are adapted to be clamped in cutting position by clamping members 345 (FIGS. 17, 18 and 19), one of which is provided for each tool. These clamping members have inclined upper surfaces 346, and are adapted to cooperate with the correspondingly inclined lower surfaces 347 formed on the clamping member 348 that is fastened by means of bolts 349 to the plate 336.

Figure 17:
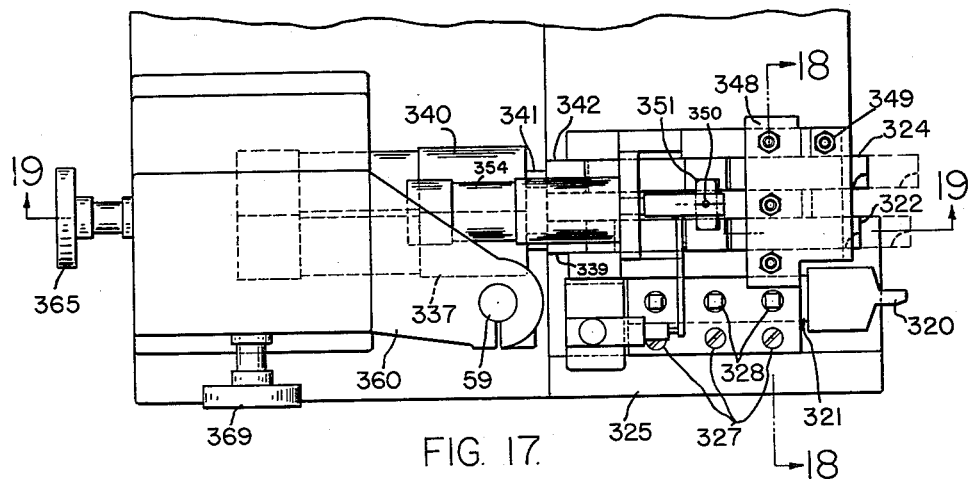
FIG. 17 is a plan view of the parts shown in FIG. 16.
Figure 18:
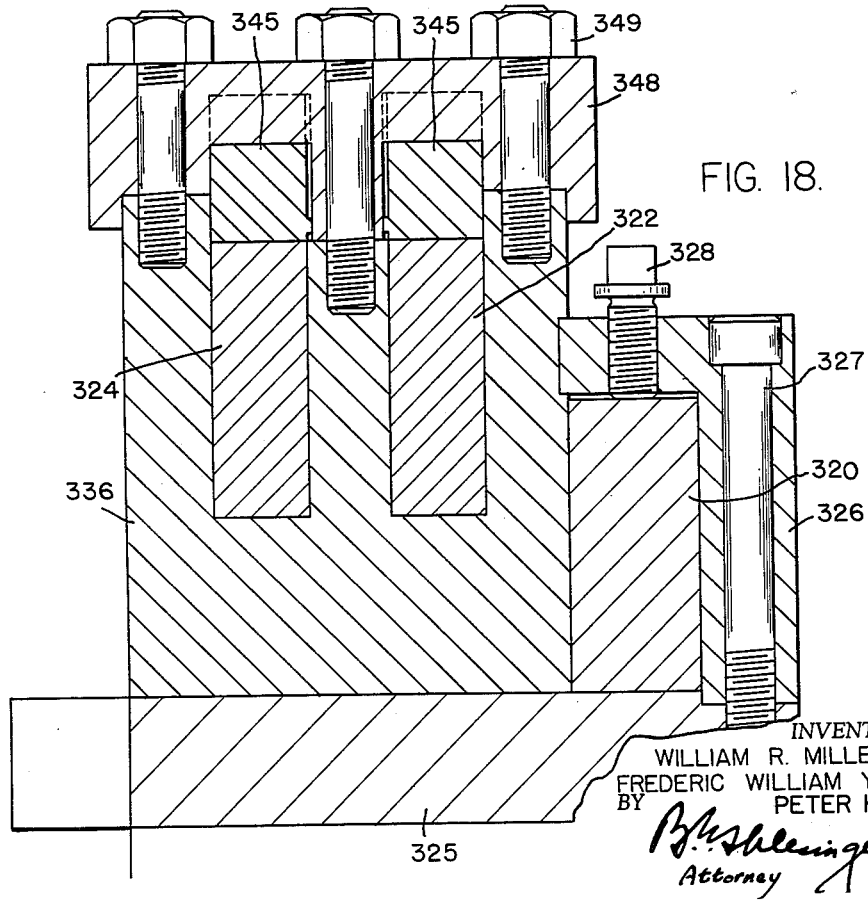
FIG. 18 is a section taken generally on the line 18—18 of FIG. 17, looking in the direction of the arrows and on an enlarged scale.

The members 345, which act as wedges, are connected at their rear ends by an equalizing block 351 (FIGS. 17 and 19) and by a pin 350 to a block 352. Equalizing block 351 is rockable on pin 350 and is engaged at opposite ends in notches in wedge members 345, as shown in FIG. 17. The block 352 is reciprocable by means of a piston 353 (FIG. 25) which reciprocates in a cylinder 354 that is mounted on the plate 336. The piston is connected by a piston rod 355 to the block 352. The piston rod passes at its forward end through a centering or locating ring 356 in cylinder 354 and through block 357 that is secured on top of the plate 336.

Figure 16:
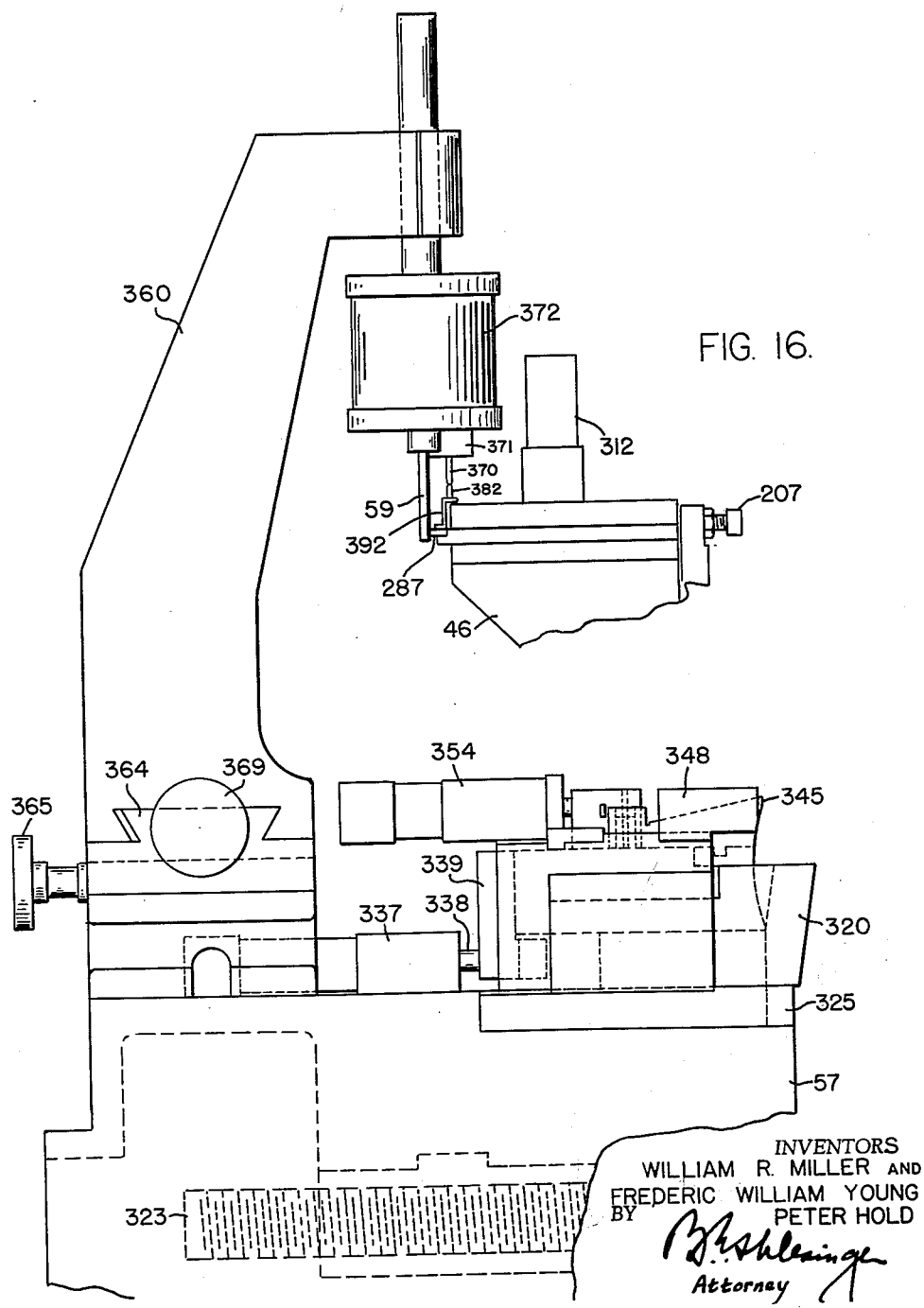
FIG. 16 is an end view on an enlarged scale of one of the tracers and the tools associated therewith.

The movements of the carriage and the cross slides are controlled by tracers of known construction which engage the templates. Each of the tracers 59 and 60 (FIG. 1) is carried by a bracket 360 (FIG. 16) that is adjustable longitudinally and transversely on the cross slide 57 or 58, as the case may be. Adjustment in the direction of movement of the cross-slide is effected by rotation of the screw 361 (FIG. 19) which is rotatably mounted in a block 362 that is fastened to the cross slide 57, and that threads into a nut 363 which is secured in a plate 364. The screw 361 is rotatable by means of the knob 365. Adjustment of the upright 360 in a direction at right angles to the direction of movement of the cross-slide, that is, in the direction of movement of the carriage 55, is effected by rotation of a similar screw 366 which is journaled in the plate 364 and which threads into a nut 367 that is secured in the base of the upright. Screw 366 is rotated by knob 369 (FIGS. 16 and 17). Gibs, such as denoted at 368 (FIG. 19), may be provided to take up wear.

Each stylus or tracer 59, 60 controls the motions of its carriage 55 or 56 (FIG. 1) and of the cross-slide 57 or 58 carried thereby. This is in known manner through electrical connections with the motors 61, 62, which drive the respective carriages, and 63 and 64, which drive the respective cross slides. When the stylus is following a particular curve as, for instance, the radius 238 (FIG. 10) the tracer controls the motions of both the associated carriage and of the associated cross-slide so that the longitudinal motion of the tool, which is effecting the cut on the work, is in the proper proportion to the transverse motion of the tool to produce the desired radius 249 on the work. It is important, however, also, to insure that the bearing surfaces of the axle, such as sections 190 and 192, be straight. For this reason means is provided in the machine illustrated for disconnecting the tracer control when machining these sections of the axle.

This means comprises a flexible trip member 370 (FIG. 12), which operates a switch 371 (FIG. 16) that, is mounted on the body 372 of the tracer, when the trip member is moved in any direction away from the vertical. This switch disconnects and connects the tracer from and to the two motors 61 and 63, and closes or opens, respectively, a circuit to the solenoids 373, 374, 380 (FIG. 25) which control the positions of the clamping member 345 (FIG. 19) and of the tools 322 and 324 (FIG. 17).

The trip member 370 is rocked, to operate the limit switch 371, by a plurality of nubs 375, 376, 377, 378, 379, 381, 382 (FIGS. 11 and 12) that are positioned to engage the trip member as it moves with stylus 59, cross-slide 57, and carriage 55. Nub 375 is mounted on a bracket 385 that is secured on plate 241. Nubs 376 and 377 are mounted on a bracket 386 secured on plate 228. Nubs 378 and 379 are mounted on a bracket 388 that is secured on template 307. Nub 381 is mounted on a bracket 390 that is secured to template 287. Nub 382 is mounted on a bracket 392 that is secured to plate 285.

There is a solenoid-operated valve 391 (FIG. 25) controlling the operation of the two hydraulically-actuated pistons 269 and 316 which reciprocate in the clamping cylinders 255 and 312 (FIGS. 14 and 10) for the probes and templates. There is a solenoid-operated valve 166 (FIG. 25) controlling the operation of the hydraulically-actuated piston 179 which reciprocates in the cylinder 170 (FIG. 6), and which swings carrier 46 between probing and operating positions. There is a solenoid-operated valve 394 (FIG. 25) controlling the operation of the hydraulically-operated piston 203 (FIG. 14) which reciprocates in the cylinder 205, and which moves the latches 209 that govern the dimension to be turned on the journal bearing fit of the axle. There is a solenoid-operated valve 395 (FIG. 25) controlling the operation of the hydraulically-operated piston 353 which reciprocates in the cylinder 354 (FIG. 19), and which controls the operation of the clamp 345. There is a solenoid-operated valve 396 (FIG. 25) controlling the operation of the hydraulically-operated piston 332 which reciprocates in the cylinder 337 (FIG. 17) and which controls the position of tool 322. There is a solenoid-operated valve 397 (FIG. 25) controlling the operation of the hydraulically-operated piston 331 which reciprocates in the cylinder 340 (FIG. 17) and which controls the position of the tool 324.

In this machine, as in conventional lathes, the screw 66 (FIG. 1) can be driven selectively at low speed or feed rate, and at high speed or traverse rate. The shift from one speed of rotation to the other is effected by shifting a clutch (not shown) which in one position connects a low speed drive from motor 61 to the screw 66, and in another position connects a high speed drive from motor 61 to screw 66. This clutch can be shifted hydraulically by a piston 399 (FIG. 25) that reciprocates in a cylinder 410 under control of a solenoid-operated valve 411, controlled by solenoid 433.

All of the solenoid-operated valves mentioned in the last two paragraphs are conventional valves. When the solenoid 431, 165, 432, 373, 374, 380, or 433, respectively, is energized the associated valve 391, 166, 394, 395, 396, 397, or 411, respectively, is shifted in one direction to put one end of the cylinder, which is under control of the valve, on supply and the other end on exhaust. The solenoid operates against a spring; and when the solenoid is deenergized the valve is shifted in the opposite direction by the spring, reversing the direction of flow of the motive fluid to and from opposite ends of the cylinder.

There is a solenoid-operated valve 413 controlling the position of the hydraulically-operated piston 123 (FIG. 25) which reciprocates in the cylinder 120 (FIG. 5) and which controls the position of center 115. There is a solenoid-operated valve 414 (FIG. 26) controlling the position of the pneumatically-operated pistons 279 and 298 which reciprocate in the cylinders 275 and 300 (FIGS. 9 and 10) and which move probes 286 and 306 into engagement with the axle that is to be machined. There is a solenoid-operated valve 415 controlling the position of the pneumatically-operated pistons 231, 232, 239 which reciprocate in the cylinders 259, 260, and 261 (FIGS. 9 and 10) and which shift the probes 245, 236, 306 and 256 longitudinally to bring them into engagement with the shoulder 253, and fillet curves 249, 303 and 288, respectively, of the axle. There is a solenoid-operated valve 398 controlling the operation of the hydraulically-operated piston 72 (FIG. 21) which reciprocates in cylinder 71 and which controls the position of the elevator 70.

All four of the valves mentioned in this last paragraph are conventional valves. These valves differ from the first-named valves merely in that there are two solenoids 417 and 418 (FIG. 26) for operating valve 414, and two solenoids 419, 424, respectively, for operating valve 415, and two solenoids 422, 423 for operating valve 413, and two solenoids 435 and 437 for operating valve 398. One solenoid, when energized, shifts the valve to its extreme position in one direction to put one end of the cylinder controlled thereby on supply and the other end on exhaust. The other solenoid, when energized, shifts the valve in the opposite direction to its other extreme position to reverse the directions of flow of the motive fluid to the cylinder. It is to be understood, of course, that when one solenoid is energized the other solenoid is simultaneously deenergized. Springs operate against the two solenoids; and the valve has a neutral position to which it is shifted by the two springs when both solenoids are deenergized. When the valve is in neutral position, the piston controlled thereby will also, of course, be in neutral position.

When the carrier 46 is swung up to horizontal operating position, the stylus will be in the position denoted at 400 in FIG. 11. Through operation of the cross slide 57 and carriage 55 the stylus will be carried from position 400 to position 401 where the stylus is deflected. This will cause the tracer to take over control of movement of both of the cross-slide 57 and of the carriage 55. The stylus will follow with great accuracy the template 247 at a prefixed feed rate, causing tool 329 (FIG. 17) to machine the button or shoulder 193 (FIG. 20). The stylus follows the contour of template 247, controlling feed of the tool both longitudinally and inwardly until the stylus reaches position 402. At this moment flexible member 370 (FIG. 12) contacts nub 375. This trips the microswitch 371 (FIG. 16), disconnecting the tracer from control of the carriage and cross-slide. The cross-slide motion ceases; but the carriage motion continues at a uniform rate, thereby producing a uniform, non-undulating cut across the bearing fit and without any taper. This is very essential in the wheel bearing fit area 192 (FIG. 10) of the axle. This uniform, non-undulating cut proceeds with the stylus clear of the template.

When the stylus reaches position 403 (FIG. 11), however, and strikes the bottom of radius or fillet curve 238, the tracer again assumes command of both the carriage and the cross slide motions since the radius 238 deflects the stylus to a greater amount than the deflection during the straight line movement of the stylus. A smooth, uniform radius 249 (FIG. 10) is produced on the work under control of the tracer.

When the trip member 370 engages the nub 376, however, switch 371 (FIG. 16) is tripped, and the solenoid 373 of the valve 395, which controls the direction of flow of the motive fluid to the cylinder 354 (FIG. 19), is energized. This causes the clamp member 345 to be shifted forward to unclamp the tools 322 and 324. The solenoid 374 of the valve 396, that governs the direction of flow of the motive fluid to the cylinder 337 (FIG. 17), is also energized. This causes the tool 322 to be shifted from the full line to the dotted line position shown in FIG. 17, bringing the tool into cutting position. An instant thereafter trip member 370 contacts nub 377 and switch 371 is tripped again to deenergize the solenoid 373 of the valve 395 which controls the cylinder 354 (FIG. 19) to cause the tool 322 to be clamped in its cutting position. The dust guard area 191 (FIG. 10) of the axle can therefore be machined with tool under control of the stylus while the stylus is traveling along the straight portion 410 of the template 237. The tracer is not removed from control during machining of the dust guard area because finish and straightness of this section of the axle are unimportant.

When the trip member 370 strikes nub 378, the solenoid 373 of the valve, which controls the direction of flow of the motive fluid to the cylinder 354 (FIG. 19), is again energized, causing clamping member 345 to be moved to released position to unclamp tools 322 and 324. Also, the solenoid 374, that controls the direction of flow of the motive fluid to cylinder 337 (FIG. 17), is denergized, and the solenoid 380, that controls the direction of flow of the motive fluid to cylinder 340, is energized. Deenergization of the solenoid 374 of the valve 396 associated with cylinder 337 causes tool 322 to be retracted. Energization of the solenoid 380 of the valve 397 associated with cylinder 340 causes tool 324 to be moved into cutting position.

When the trip member 370 strikes nub 379, the solenoid 373 of the valve 395, which controls the direction of flow of the motive fluid to the cylinder 354 (FIG. 19), is deenergized. This causes the tool 324 to be clamped in cutting position.

The cut proceeds with tool 324 under tracer control until the stylus reaches position 405 (FIG. 11) on template 287. At this point, trip member 370 strikes nub 381 and switch 371 is tripped to disconnect the tracer control, and the cross-slide 57 remains stationary. The wheel fit section 190 of the axle is therefore machined at constant speed.

Figure 19:
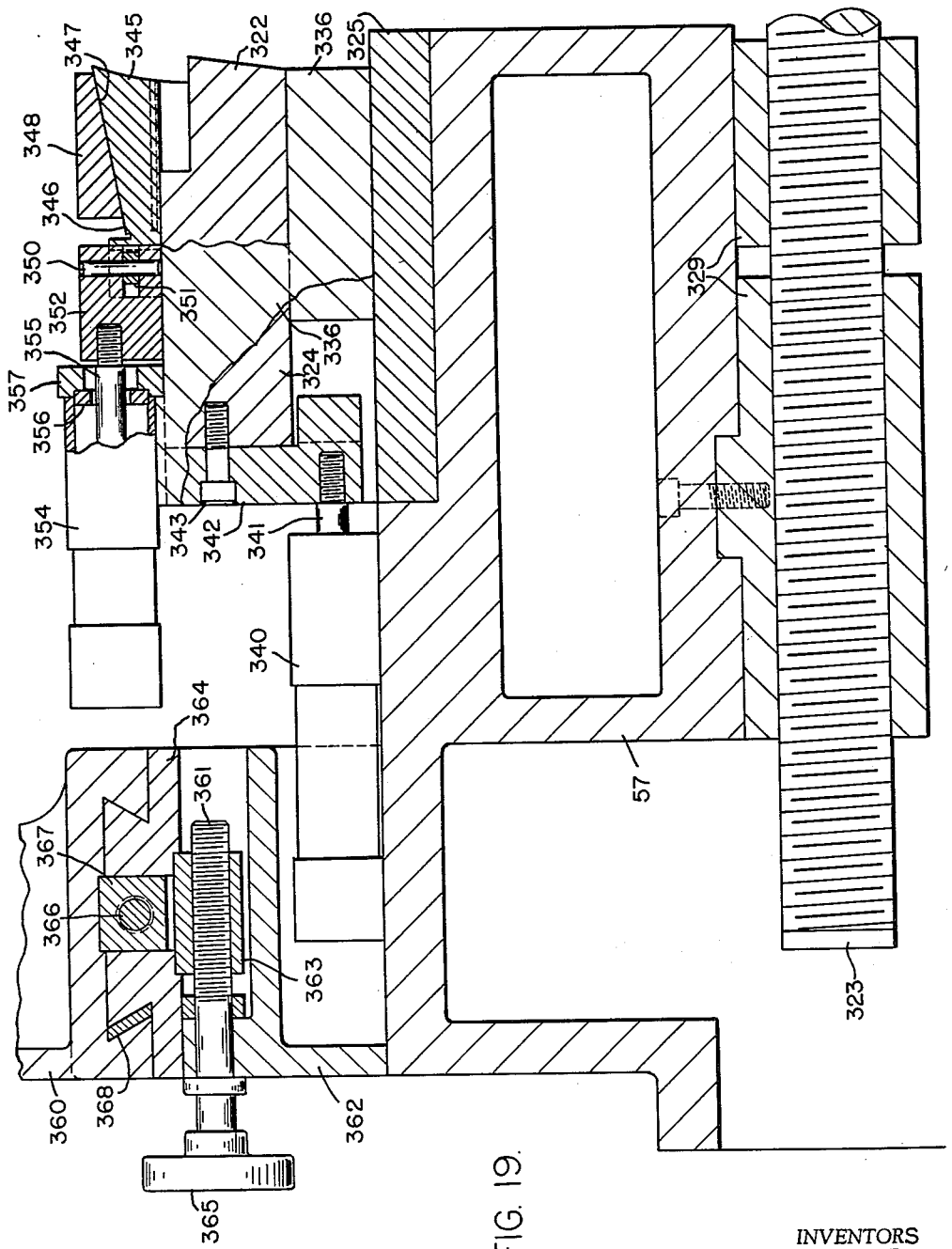
FIG. 19 is a section on the line 19—19 of FIG. 17, looking in the direction of the arrows and on an enlarged scale.

When the stylus strikes the radius 290 (FIG. 11) of template 287, however, the stylus is additionally deflected and the tracer again resumes control of the machining operation; and the fillet curve 288 is produced on the axle by tool 324 under control of the tracer. When the trip member 370 strikes the nub 382, the switch 371 is again tripped to stop the tracing operation, to again energize the solenoid 373 of the valve 395, which controls the direction of flow of the motive fluid to the cylinder 354 (FIG. 19), and to deenergize the solenoid 374 which controls the direction of flow of the motive fluid to cylinder 337 (FIG. 17). Thus tool 324 is unclamped and retracted. The operation of machining the left hand end of the axle is completed. The right hand end will have been machined simultaneously with the left hand end, the operation proceeding as with the left hand end except for hand. The carriages and cross-slides can now be returned to starting position at traverse rate by clutching the traverse rate gears to screws 66 (FIG. 1) and 323 (FIG. 19).

By use of separate tools and separate templates and of the nubs or dogs for controlling the movement of tools 322 and 324 into and out of cutting position, it is possible with this machine to use the same templates for controlling the fillet curves 249 and 308 (FIG. 10) produced on the axle regardless of the diameters of the journal sections 192 and 190 of the axle, so long as these diameters are within the allowable maximum-minimum range. Template 237, for instance, has a given radius 238, the arc of which is long enough for the maximum permissible height of the shoulder or fillet curve 249 connecting the journal section 192 and the dust guard section 191. The actual diameter of the dust guard section 191 may, however, be well below the maximum permissible diameter, and may even be such that the fillet curve 249 will be down to the minimum accepted height for such a curve or shoulder. Nub or dog 376 (FIGS. 11 and 12) is positioned, however, to move tool 322 into cutting position at a point to the left of where tool 320 leaves off cutting. Tool 322, therefore, can cut along a straight path which intersects the cutting path of tool 320, that is, tool 322 can, under control of template 307, cut along a straight path radially of the workpiece within the path along which tool 320 travels under guidance of template radius 238 when cutting fillet curve 249. The tool 322 therefore can form the desired diameter on the dust guard section of the axle after tool 320 has cut a fillet curve 249 which will be of the radius determined by template 237 but which will be of a height determined by the location of the template 307 radially of the workpiece.

The combination of separate templates for the journal section 192 and for the dust guard section 191, respectively, and of separate tools for these sections, respectively, makes possible machining of the axle sections under tracer control within the range of permissible height of the shoulder or fillet 249 with the same templates 237 and 307. The same thing is attained as to the height of shoulder 308 through use of separate templates 307 and 287 and separate tools 322 and 324. One way in which the machine may be wired electrically to accomplish its purpose is shown in FIGS. 27A, 27B and 27C. In these FIGS. $L_1$, $L_2$ and $L_3$ denote main electric lines; and 512 (FIG. 27A) designates the switch for connecting or disconnecting the electric wiring of the machine to these main lines. 513 and 514 are the switch blades of a conventional relay for connecting the two motors 140 and 110, which drive the left and right work spindles (FIGS. 1, 3 and 5), respectively, into circuit. These relay arms or switches are controlled by conventional relay coils 660 and 663, respectively, (FIG. 27C).

The relay arms or blades 517 and 518 for the reversible motor 156 (FIGS. 1 and 3) are to put this motor into forward and reverse, respectively. These relay arms or blades are controlled in conventional manner by conventional relay coils 538 and 545 (FIG. 27A).

The hydraulic motor of the machine is denoted at 510 (FIG. 27A) and it is connected in circuit or disconnected by the blade arms 519 of a conventional relay whose coil is denoted at 520. This coil is connected not only with the line $L_1$ and $L_3$, but also with the controls 515 and 516 for the variable speed motors 61, 62, 63 and 64 (FIG. 1) which operate the carriages and the cross slides of the machine. These controls are conventional controls for variable speed motors and for this reason need not be illustrated here. When the main switch 512 is closed, relay coil 520 is energized to close relay arms 519 and start the hydraulic pump motor 510. Thus the hydraulic pump motor runs as long as the machine is in operation. This is common practice in large machine tools.

Figure 5:
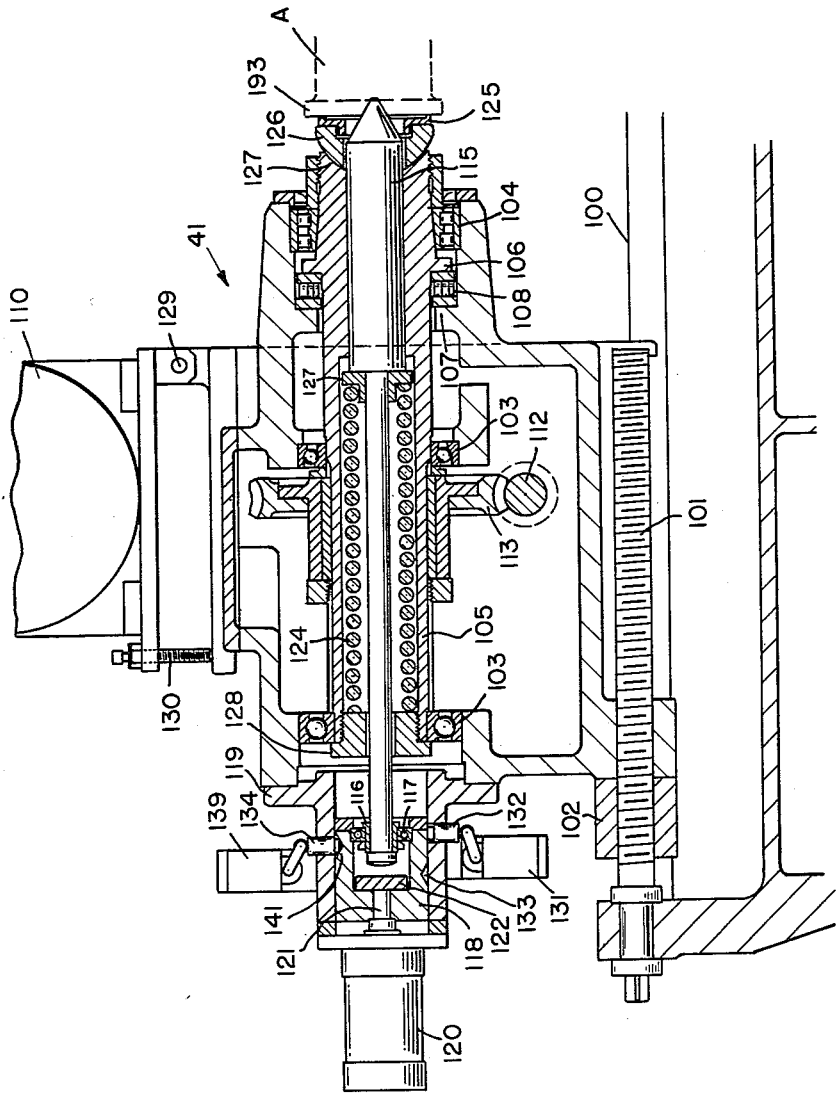
FIG. 5 is an axial section through the left spindle head of the machine.

To start the machine operations themselves a start button 522 is closed. A circuit is thus made through a conventional, normally-closed stop button 521, and the closed start button 522 to the machine start relay coil 524, which may be of conventional construction. This circuit is held after release of start button 522 through relay arm 523 which is closed upon energization of associated coil 524. When coil 524 is energized it closes not only relay arm 523 but also arm 525 of this same relay. Since limit switch 86 (FIG. 21) is at this time closed, the elevator being in its down position, a circuit is made to relay coil 526. The arm 61 (FIG. 2) is thereupon moved forward to deliver the axle, which is to be machined, into alignment with the centers 115 and 145 (FIGS. 5 and 3).

At this time the double-armed switch 425 is in the position shown in FIG. 27B. Hence relay coil 595 is energized. This closes associated relay arm 527. Relay arm 528 associated with relay coil 546 is normally-closed. When arm 61 closes limit switch 67 (FIG. 2) as already described, then, conventional relay coil 530 is energized.

This closes the relay arms 535 and 537 associated with relay coil 539. The circuit closed by closing of limit switch 67 is held closed by relay arm 529 of the relay whose coil is indicated at 625 (FIG. 27B).

The closing of relay arm 535 causes solenoid 423 (FIG. 25) and relay coil 536 to be energized, the circuit being made through now closed relay arms 527 and 535. Solenoid 423 shifts valve 413 (FIG. 25) to cause the left hand center 115 (FIG. 5) to be advanced. Energization of relay coil 536 merely trips the relay coil 635 (FIG. 27B).

Closing of relay arm 537 closes a circuit to relay coil 538 through now-closed relay arms 527 and 537. This closes the associated relay arms 517 starting motor 156 (FIG. 3) in a direction to apply pressure to the left hand center 145. The motor 156 drives in the reverse direction only when relay arms 539 and 540 are closed. Relay arm 540 is held open as long as the associated relay coil 547 is energized, which is as long as limit switch 421 is closed. Relay arm 539 is closed when relay coil 630 (FIG. 27B) is energized. At this time it is deenergized because relay arms 606, 607, 608, 609 (FIG. 27B) are open.

The screw 155 is driven in a direction to press center 145 (FIG. 3) to the left until the workpiece is held under the desired pressure. Then limit switch 159 (FIG. 4) is closed energizing relay coil 546. This causes associated relay arm 528 to be opened breaking the circuit to relay coil 530. This stops the advance of screw 155 (FIG. 3). When limit switch 421 opens, relay coil 547 which is associated with relay arm 540, opens, breaking the retracting circuit to motor 156 (FIG. 3).

The probing operation is started upon energization of relay coil 551. This occurs when relay arm 550 is closed. This arm is associated with relay coil 546 and is closed when coil 546 is energized. Simultaneously relay arm 528, which is also associated with coil 546, is opened. Relay arms 548 and 549 are closed. Relay arm 548, together with relay arms 584 and 599 (FIG. 27B), is associated with relay coil 596. Relay arm 549 is associated with relay coil 570 (FIG. 27B).

When relay coil 551 is energized, it closes associated relay arms 552 and 563 and opens associated relay arm 553. This energizes solenoids 165 (FIG. 25) and 432 and deenergizes solenoid 438. The pistons 179, 179' are therefore moved in cylinders 170 (FIGS. 1 and 7) to swing the probe carriers toward the workpiece. These carriers are retracted when relay coil 551 is deenergized.

When relay arm 563 is closed a circuit is made to solenoid 432 (FIG. 25) through already closed relay arm 562.

When the carriers have swung far enough to close limit switch 187 (FIG. 8) relay coil 560 is closed. This closes relay arms 561, 564 and 567 (FIGS. 27A and 27B), and opens relay arm 562, all of which are associated with coil 560. Closing of relay arm 561 closes the coil 500 of the time relay which, as already described, controls air cylinders 275 and 300 (FIG. 10), forcing the probes 286 and 306 into engagement with the dust guard section 191 and the wheel fit section 190, respectively, of the workpiece.

Closing of relay arm 564 (FIG. 27B), closes the circuit to solenoid 417 (FIG. 26), for relay arm 565, which is controlled by relay coil 570, is already closed. This shifts the valve 414 to effect transverse movement of the probes and with them of the templates.

Closing of timer contact 501 causes solenoid 419 (FIG. 26) to be energized to move the probes and templates longitudinally, because relay arm 566, which is controlled by relay coil 570, is at this time closed.

Closing of relay arm 567 closes the circuit to timer coil 502 already mentioned. This coil closes timer contact or relay arm 568 and opens timer contact 503. Closing of relay arm 568 merely establishes a hold-in circuit to coil 502 independent of relay arm 567 and its coil 560. Opening of contact 503 breaks the circuit to solenoid 431 (FIG. 25), and that circuit remains broken until timer 502 times out. Then contact 503 is reclosed and the circuit to solenoid 431 is reestablished to cause the templates to be unclamped.

When the template clamping pressure has built up sufficiently, as already described, pressure switch 505 is closed, energizing the relay coil 570 already mentioned.

When the probing cycle has been completed, and the probe carrier 46 (FIG. 8) has swung out to the postion it occupies when the machine operations are taking place, limit switch 186 is closed. This closes a circuit to relay coil 571 which closes associated relay arm 572. Relay arm 573 was closed when a circuit was made to its associated relay coil 546 (FIG. 27A). Relay arm 574, which is controlled by relay coil 610, is at this time closed, as is also relay arm 575, which is controlled by its associated coil 595. Thus a circuit is established to relay coil 580 which starts the tracing operation.

Limit switch arms 195 are at this time in the position shown in FIG. 27B so that relay coil 581 is energized. This causes relay arm 583 associated with this coil to be closed. Relay arm 582 associated with relay coil 600 is closed upon energization of coil 600. Relay arm 584 associated with relay coil 596 is likewise closed upon energization of coil 596. Hence solenoid 433 (FIG. 25) is now energized to shift valve 411 and cause traverse of the carriage 55. This causes tracer 59 (FIG. 16) to follow the now adjusted templates.

In the starting position of the machine limit switches 425 are the positions shown in FIG. 27B and relay coil 595 is energized, the cross-slide 57 (FIG. 1) is out, and the limit switch 593 is open. At this time limit switch 426 is closed and coil 596 is energized. This closes associated relay arm 599. When relay coil 595 is energized, associated relay arm 598 is closed. Relay coil 600 is therefore energized, closing relay arms 582, 597, 605.

When relay arm 605 is closed, solenoid 418 (FIG. 26) causes transverse retraction of the probe and template supports.

For slowing the speed of rotation of the spindles 105 (FIG. 5) and 135 (FIG. 3) a conventional plugging relay 610 may be provided. This is energized either when relay arms 606 and 607 are closed, or when relay arms 608 and 609 are closed. Arm 606 is closed upon energization of coil 600 as already described. Arm 607 is closed upon energization of associated coil 670. Arm 608 is closed upon energization of latch coil 645. Arm 609 is closed upon energization of its associated coil 610 so that it acts as part of a hold-in circuit for that coil.

Figure 25:
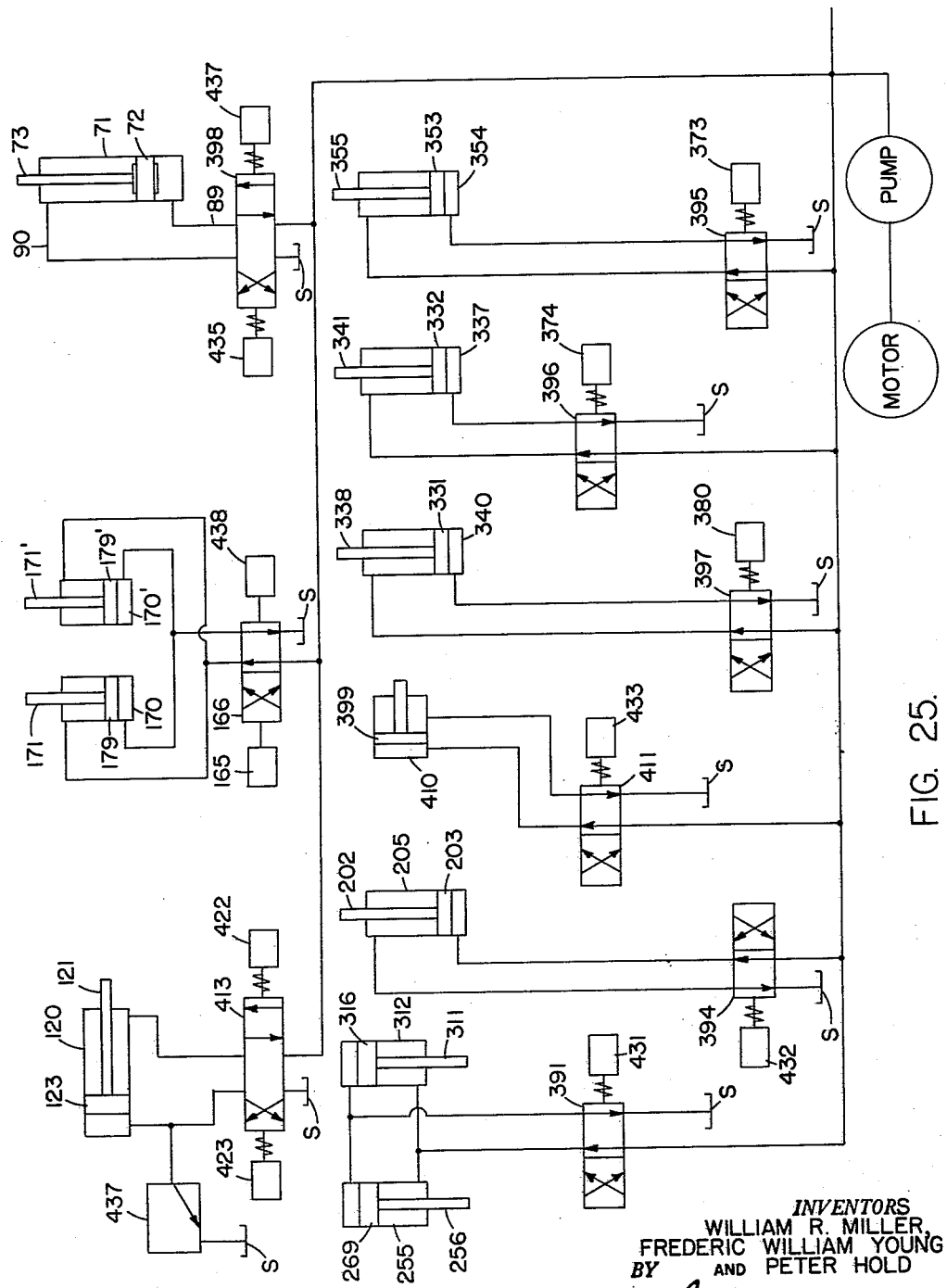
FIG. 25 is a diagram illustrating the hydraulic circuitry of the machine.

Relay arm 615 is controlled by the associated coil 670. Relay arm 616 is controlled by the associated coil 610. When these two relay arms are closed, a circuit is made to the unload relay coil 617, which starts the unloading cycle. This coil has a relay arm 618 associated with it. When this coil is energized, it closes relay arm 618. When this relay arm is closed, and relay arms 619, 620 and 621, which are controlled by associated coils 625, 610, and 645, respectively, are closed, a circuit is made to the solenoid 437 (FIG. 25). This starts the elevator 75 up to receive the now-machined axle. The relay arm 622 is closed as long as relay coil 647 is energized. Limit switch 507, when closed, closes a circuit to relay coil 625, which controls associated relay arm 619. When relay coil 630 is energized it closes associated relay arm 626. Relay coil 630 is energized as long as relay arms 627, 628 and 629, that are controlled by relay coils 625, 596 and 635, are closed. Limit switch 131 (FIG. 5) is at this time open. When a coil 530 (FIG. 27A) is energized, it closes the associated relay arm 632. When switch 131 is closed, a circuit is made to relay coil 635 which controls advance of the left-hand center 145 (FIG. 3).

Relay arms 636 and 637, which are controlled by the associated coils 640 and 547, respectively, are normally closed; and when relay arms 619, 618, 607, 606 and 608 are closed, solenoid 422 (FIG. 25) is energized. This solenoid may be held energized through relay arms 638 and 639 when these are closed. These relay arms are controlled by associated coils 635 and 640, respectively. When limit switch 139 (FIG. 5) is closed, a circuit is made to relay coil 640. When double-armed limit switch 508 is in the position shown in FIG. 27B and limit switch 641, which is controlled by associated relay coil 647, is closed, as shown, a circuit is made to relay coil 645.

When relay arm 646, which is controlled by the associated relay coil 651 (FIG. 27C), is closed, and double-armed limit switch 508 is shifted upwardly, a circuit is closed to relay coil 647. This coil establishes its own hold-in circuit through relay arm 648 which is associated with the coil 647.

There is a limit switch 650 (FIG. 27C) associated with the elevator switch 86 (FIG. 21) which is open when the switch 86 is closed, and vice versa. When this switch 650 is closed a circuit is made to the coil 651. This coil controls the relay arm 653 and, when energized, closes this relay arm. When coil 647 (FIG. 27B) is energized, it closes relay arm 652. When the two relay arms 652 and 653 are closed, a circuit is made to the solenoid 435 (FIG. 25).

When relay arms 654, 655, 656 and 657 (FIG. 27C) are closed by energization of their respective relay coils 524 (FIG. 27A), 546, 571 and 580, a circuit is closed to coil 660, as long as relay arm 658, which is controlled by its associated relay coil 600 (FIG. 27B) is closed. At the same time the relay coil 663 is energized. The two coils 660 and 663 control, respectively, the relay arms 513 and 514 for the spindle drive motors 110 and 140 (FIGS. 5 and 3). The relay arm 661, which is controlled by its associated relay coil 670 (FIG. 27B) and the relay arm 662, which is controlled by its associated coil 596 (FIG. 27B) are to provide a hold-in circuit for the coils 660 and 663. When the circuit is closed to relay coil 660, it closes its associated relay arm 664 (FIG. 27C), closing the circuit to the relay coil 670.

When coil 670 is energized, it closes its associated relay arm 671, thereby closing a circuit to the coil 675. A hold-in circuit for this coil is maintained through the relay arm 673, which is controlled by the associated relay coil 595, and through the relay arm 674 which is controlled by its associated relay coil 675. Relay coil 675, when energized, also closes the associated relay arm 693, establishing a circuit to the relay coil 692. When this coil is energized, it closes the associated relay arm 690 to establish a hold-in circuit for the coil 692. Coil 692, when energized, also closes the associated relay arm 695. As long as the limit switch 696 is in the position shown in FIG. 27C, then, a circuit is maintained to the relay coil 700. This coil controls the two switches 696 and 707. When it is deenergized, switch 696 is closed. When it is energized, it opens switch 696 and closes switch 707. When relay arms 705 and 706, which are controlled by the associated relay coils 595 (FIG. 27B) and 600, respectively, are closed, then, the circuit to the relay coil 700 is maintained.

When the double-armed switch 371 is in the position shown in FIG. 27C, and coil 698 is energized to close its associated relay arm 716, a circuit is made to the relay coil 717. When this coil is energized, it closes the associated relay arm 710. When the limit switch 371 is shifted, then, a circuit is made to the relay coil 715. The circuit to the relay coil 717 is maintained through the relay arm 718 which is associated with this coil.

The trip member 370 (FIGS. 12 and 16) is connected to the switch 371 which is a conventional stepping switch connected as shown in FIG. 27C to the conventional control 515 for the motors 61 and 63, which drive the carriage 55 and cross slide 57, respectively (FIG. 1). When the relay arms 735 and 736, which are controlled by the associated coils 698 and 692, respectively, are closed as shown and this switch is in the position shown in FIG. 27C a circuit is made to the control 515. The same thing is true when the switch 371 is shifted so that it makes contact in positions 1 and 2 successively. In position 3, the switch closes a circuit to coil 741. This closes the associated relay arm 752, making a circuit to the relay coil 755, so long as the relay arm 754 is closed. This relay arm 754 is normally closed, and is not opened until the switch 371 in its stepping action makes contact at 4 in FIG. 27C, energizing coil 742 which is associated with relay arm 754. When relay coil 755 is energized, it closes associated relay arm 751, causing solenoid 380 (FIG. 25) to be energized. The hold-in circuit to this solenoid is through the relay arm 750 which is associated with the coil 742. Relay arm 753 is also associated with the coil 755 and establishes a hold-in circuit for that coil. Relay arm 767 is also associated with coil 755 and closed when that coil is energized.

When the stepping switch 371 has moved to position 5 in FIG. 27C it closes a circuit to the relay coil 743. This closes the associated relay arm 760, which closes a circuit to the coil 766 as long as the relay arm 760 is closed. Relay arm 760 is controlled by the associated relay coil 743.

When the flexible trip member 370 (FIG. 12) contacts the next nub 375 to 382 in the operation of the machine, that is, when it arrives at step 6, coil 745 is energized. This closes the associated relay arm 756 and opens the associated relay arm 761.

When relay arm 756 is closed, a circuit is made to the solenoid 374 (FIG. 25.) When relay arm 761 is open, the circuit to the relay coil 766 is broken.

In the next step of the stepping switch 371, the coil 746 is energized. This closes the associated relay arm 772, which closes a circuit to the solenoid 373 (FIG. 25) so long as the arm 773, which is associated with the time relay coil 771, is closed. Timer relay coil 771 is closed when relay arm 767, which is associated with relay coil 755 is closed and as long as relay arm 769, which is associated with relay coil 692 is closed. When relay coil 745 is deenergized, relay arm 761 is opened.

The operation of the machine will be understood from the preceding description, but may be summed up briefly here.

The axle, which is to be machined, is carried from a conveyor by arm 61' (FIG. 2) into alignment with the centers 115 (FIG. 5) and 145 (FIG. 3) which are, of course, at this time in their retracted positions. At this time, also, the elevator is down contacting limit switch 86 (FIG. 21), the right hand head (FIG. 1) is retracted so that lug 420 contacts limit switch 421, and one of the solenoids 422, 423, which control the position of the valve 413 that governs flow of the motive fluid to cylinder 120 (FIG. 5) and which will be called hereinafter the left hand spindle center retracting solenoid 422, is energized holding the left hand spindle center 115 in retracted position.

When the conveyor arm 61' (FIG. 2) has brought the axle into alignment with the centers 115 and 145, it trips switch 67. This deenergizes the left hand spindle center retracting solenoid 422, and energizes the other solenoid 423 associated with valve 413, which will hereinafter be called the left hand spindle center advancing solenoid, resulting in shift of the valve, with the result that the left hand spindle center 115 is advanced. Tripping of switch 67 (FIG. 2) also starts motor 156 (FIGS. 1 and 3) to move the right spindle head 42 forward, that is, to the left. As this head advances the axle is picked up between centers 115 and 145 and pressure is built up on the left hand spindle center 115 causing the hydraulic motive fluid to be expelled from the left hand end of cylinder 120 through a conventional relief valve 437' (FIG. 25).

The axle is shifted to the left until it contacts the driving collar 125 (FIG. 5); and the right hand head 42 continues forward building up pressure until limit switch 159 (FIG. 4) is tripped.

When this limit switch 159 is tripped it stops motor 156 (FIG. 1), stopping the advance of the right hand head. This limit switch also deenergizes the left hand spindle center advance solenoid 423. This limit switch will also deenergize one of the solenoids associated with the valve 166 that controls cylinder 170 (FIG. 7) which will hereinafter be called the template tracing position solenoid 438, and energizes the other solenoid 165 associated with this valve, causing template carrier 46 to be swung into setting position, that is, until it contacts position stop 181 (FIG. 8) and limit switch 187. The limit switch 159 will also energize the solenoid 431 associated with the valve 391 that controls flow of the motive fluid to the cylinders 255 and 312 (FIG. 10) thereby unclamping the templates and probes. The limit switch 159 also energizes the solenoid 432 which controls flow of the motive fluid to cylinder 205 (FIGS. 13 and 14) causing cocking of the probe latch 209. The limit switch 159 will also cause the axle loading arm 61' (FIG. 2) to be retracted.

When the limit switch 187 (FIG. 8) is tripped, it deenergizes the solenoid 432 associated with the valve 394 that controls the direction of application of fluid pressure to piston 203 (FIG. 14). Cylinder 205 is therefore moved inwardly to the left in FIG. 14 until stop 207 contacts the bearing journal 192 (FIG. 10). When limit switch 187 is tripped, one of the solenoids 417, 418 (hereinafter called the engaging solenoid 417), which operate the valve 414, that controls the direction of application of fluid pressure to cylinders 275 and 309 (FIG. 10), is also energized causing the probes 286 and 306 to be moved inwardly into engagement with the axle. When the limit switch 187 is tripped, two timers 500—501, 502—503 also are actuated. The purpose of these timers is merely to insure sufficient delay for the stop 207 and the probes 286 and 306 to contact the respective portions of the axle, which they are intended to engage, before the next step in the operation of the machine occurs. These timers are of conventional construction, and have therefore not been shown.

When one of these timers 500—501 times out, that is, the time, for which it has been set, expires, one of the solenoids 419, 424 (hereinafter called the engaging solenoid 419), which operate the valve 415, that controls the direction of application of fluid pressure to the cylinders 250, 260 and 261 (FIG. 9) is energized, causing the probes 245, 235, 306 and 286 (FIG. 10) to be brought into engagement with the respective shoulders or fillets 253, 249, 308 and 283 of the axle. When the other timer times out, the solenoid 431, which controls the direction of application of fluid pressure to cylinders 255 and 312 (FIG. 9), is deenergized. The probe plates are therefore clamped in their sensing positions between plates 257 and 258 (FIG. 14) and between corresponding plates 310 and 313 (FIG. 10).

When the clamping pressure has built up sufficiently, a conventional pressure-operated switch 505 is tripped which deenergizes the engaging solenoids 417, 419 associated with cylinders 275, 309 (FIG. 10) and with cylinders 250, 260 and 261 (FIG. 9), causing these valves to be reversed, thus relieving the pressure on the probes 245, 235, 286 and 306 (FIG. 10). At the same time, this pressure-operated switch deenergizes the solenoid 165 associated with the valve 166, which controls the direction of application of fluid pressure to cylinder 170 (FIG. 7) and energizes the other solenoid 438 associated with that valve, thus shifting this valve and causing carrier 46 to swing the templates into trace position against stop 180 and switch 186 (FIG. 8).

When switch 186 is contacted, the motors 110 and 140 (FIG. 1) are started to drive the spindles 105 (FIG. 5) and 135 (FIG. 3) causing the axle to be revolved on its axis. At the same time the motors 61 and 62 (FIG. 1) are started to cause the carriages 55 and 56 to be traversed from left to right and from right to left, respectively. The left hand carriage 55 is traversed to the left until the carriage or a lug thereon contacts limit switch 195 (FIG. 1). In this position, the tools carried by this carriage are disposed for the start of the cutting cycle. Similarly the right hand carriage is traversed until it trips limit switch 196 (FIG. 1) which positions the tools on this carriage for the start of the cutting cycle. Since the turning operations on both ends of the axle are similar only one will be described.

Limit switch 195 can be arranged to shift, when tripped, the speed of rotation of screw 66 (FIG. 1) from high speed, traverse motion, to the low speed feed rate for tracing if desired. When tripped it also starts motor 63 which actuates the cross-slide 57.

When the stylus, which is mounted on the cross-slide, strikes the inclined surface of template 47 (FIG. 11), it will be deflected. This will cause the tracer to take over control of the movements of both the cross-slide 57 and of the carriage 55. The stylus will follow with great accuracy the template 247 at a fixed feed rate, causing the tool 320, which is the only tool then in cutting position (the outer two tools 322 and 324 being retracted), to machine the button or shoulder 193 of the axle as the axle rotates under the tool.

When the flexible member 370 contacts nub or dog 375, the tracer control is disconnected; the cross-slide motion ceases; but the carriage motion continues at a uniform rate, thereby producing a uniform, smooth cut across the bearing fit area 192 (FIG. 10) of the axle. When the stylus strikes the radius or fillet curve 238, however, the tracer again assumes command of both the carriage and cross-slide motions. A smooth, uniform radius 249 is thus produced on the axle under control of the tracer.

When the trip member engages the nub 376 (FIG. 11), however, the solenoid 373 (FIG. 25) of the valve 395, which controls the direction of flow of the motive fluid to the cylinder 354 (FIG. 19) is energized, and clamp member 345 is shifted forward to unclamp tools 322 and 324. The solenoid 374 (FIG. 25) of the valve 396, which governs the direction of flow of the motive fluid to the cylinder 337 (FIG. 17), is also energized. This causes the tool 322 to be brought into cutting position. This tool is then clamped in cutting position, this occurring when trip member 370 contacts nub or dog 377 (FIG. 12), which trips switch 371 (FIG. 16) and causes the solenoid 373 of the valve 395 which controls cylinder 354 (FIG. 19) to be deenergized.

The dust guard area 191 (FIG. 10) of the axle is thus machined under control of the tracer while the stylus is traveling on the straight-line portion 410 of template 237.

When the trip member 370 strikes nub or dog 378, as previously described, clamping member 345 is moved to released position to unclamp tools 322 and 324, tool 322 is retracted, and tool 324 is moved into cutting position. Then tool 324 is clamped in cutting position.

The tool 324 cuts the wheel fit section under tracer control until the stylus, as described, reaches position 405 (FIG. 11) on template 287. At this point trip member 370 strikes nub 381 and switch 371 is tripped to disconnect the tracer control. At this point, also, the speed of rotation of the spindles 105 (FIG. 5) and 135 (FIG. 3) may, if desired, be shifted from high speed to low speed through operation by switch 371 of a conventional gear shift clutch or speed reducer.

When the stylus strikes the radius 290 (FIG. 11) of template 287, however, the tracer again resumes control of the machining operation; and the fillet curve 288 is produced on the axle by tool 324 under control of the tracer.

When the trip member 370 strikes nub or dog 382 the tracing operation is stopped, the tool 324 is unclamped and retracted, and the cross-slide is reversed through conventional reversing means, either by shifting a clutch or by reversal of motors 64 and 63. The tools are therefore moved clear of the work.

When the tools are clear of the work, a limit switch 425 (FIG. 1) carried by the cross-slide 57 is tripped by a lug or dog on the carriage 55. This limit switch stops the spindle drive motor 110. It causes the clutch, which controls the speed of movement of the carriage 55, to be shifted to reverse the carriage 55 and return it at high, traverse speed to starting position; and it causes the solenoids 431, 418, and 424, respectively, associated with the valves that control the direction of flow of the motive fluid to cylinders 255 and 312 (FIGS. 9, 10 and 14) and the direction of flow of the motive fluid to the cylinders 275, 300 (FIG. 10), and 250, 260 and 261 (FIG. 9) to be energized to unclamp and retract the probe template.

When the carriage 55 reaches starting position it trips limit switch 426 (FIG. 1). This stops motor 61 stopping the movement of the carriage. This also deenergizes the solenoid 418, previously energized, that controls the valve 414, which governs flow of the motive fluid to cylinders 275 and 300 (FIG. 10), permitting the springs associated with that valve to move it to neutral position, thereby relieving the pressure on the probe-templates. Limit switch 426 (FIG. 1) also causes one of the two solenoids 435, 437 (FIG. 25) which are associated with the valve 398 that controls the direction of flow of the motive fluid to the cylinder 71 (FIG. 21), to be energized. This solenoid 437, when energized, causes the elevator 70 to be moved upwardly until limit switch 86 is tripped. This deenergizes the solenoid 437 previously energized, stopping the upward movement of the elevator. It also energizes that solenoid 423 of the two solenoids 422, 423, which are associated with the valve 413 that controls the direction of flow of the motive fluid to cylinder 120 (FIG. 5), which causes advance of the spindle center 115, advancing that center to the right. It also starts the motor 156 (FIG. 3) to cause that motor to drive screw 155 in a direction to retract head 42.

The axle therefore moves to the right until it centers over the elevator. Then the sleeve 188 (FIG. 5), which moves with the left hand spindle center 115, trips limit switch 131. This deenergizes the spindle center advance solenoid 423 and energizes the other solenoid 422 which operates on the valve 413 that controls flow of the motive fluid to cylinder 120, causing the left hand spindle center 115 now to be retracted.

Meantime the right hand head 42 is being retracted. When it has gone far enough to trip limit switch 421 (FIG. 1), motor 156 will be stopped.

When limit switch 421 is tripped and when the retracting sleeve 118 trips limit switch 139 (FIG. 5) the solenoid 437 (FIG. 25), which controls upward movement of the elevator 70 (FIG. 21), will be again energized, causing the elevator piston 72 to resume its upward travel. At the upper end of its stroke, the projection 79 on the elevator will engage the bar 81 (FIG. 23); and the axle will be automatically tipped onto the discharge conveyor rails 65.

As the axle rolls down the conveyor rails 65, it trips a switch 508 which deenergizes the solenoid 437 that has caused upward movement of the elevator and energizes the other solenoid 435 associated with the directional control valve for piston 72, causing the elevator to descend. When the elevator has descended to its down position, limit switch 86 is tripped, and the down movement of the elevator stops. The cycle is complete.

In FIGS. 25 and 26, the several valves are illustrated diagrammatically, the arrows denoting the direction of flow of the fluid through each valve when the duct denoted by the arrow is in operative relation with the conduits which the respective valve controls. P denotes the pressure line; and S designates the sump. The pump for supplying the hydraulic motive fluid is marked "Pump" in FIG. 25; and the motor which drives the pump is marked "Motor 510." The compressed air, which operates the pneumatically-operated parts of the machine may be supplied from a compressed air line in the factory or from a compressor C (FIG. 26) coupled to the machine. Only the cylinders, pistons, and valving for actuating and controlling the parts associated with the left-hand support 46 (FIG. 1) are shown in FIGS. 25 and 26. The cylinders, pistons and valving associated with the right hand support 47 (FIG. 1) are not shown in FIGS. 25 and 26 because they are identical with the parts shown in these figures.

In some cases because of wear the centering holes in the ends of the axle, which is to be machined, may be so eccentric of the axis of the axle as to make it impossible to rework the axle at least without recentering the holes. Before starting the probing and machining operations on the axle, an eccentricity tester may be mounted on the machine; and the first operation, before probing, may then be checking of the axle to see whether its centering holes are sufficiently central of the axis of the axle to permit it to be gainfully machined, or whether they are so eccentric as to require either that the holes be reworked or the axle be discarded.

While the invention has been described in connection with the machining of railroad carwheel axles, it will be understood that it is applicable to the machining of other forms of workpieces also which have portions of different diameters axially of the workpiece. It will be understood, therefore, that while the invention has been described in connection with one embodiment thereof and one use for that embodiment, it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. A machine for machining an axle or the like which has longitudinally spaced portions of different diameters that form at least two longitudinally spaced shoulders, comprising means for rotatably supporting the workpiece, a tool support movable longitudinally and radially of the workpiece, a pair of sensing elements, means for moving said sensing elements into and out of operative relation with the workpiece, means for moving said sensing elements relative to one another longitudinally and radially of the workpiece after they have engaged the workpiece until they engage the two spaced shoulders of the workpiece, and means for controlling the longitudinal and radial movements of said tool support during the machining operation comprising a pair of templates connected to said two sensing elements, respectively, to be positioned thereby prior to the machining operation upon movement of said sensing elements into engagement with said spaced shoulders, and follower means movable along said templates and connected to said tool support and engaging said templates to control the radial and horizontal movements of said tool support.

2. A machine tool for finish-machining a rough-contoured workpiece comprising a reciprocable carrier, a sensing element movably mounted on said carrier, means for moving the carrier prior to a matching operation to a sensing position and means for moving said carrier after a sensing operation to a control position, means for moving the sensing element relative to said carrier into engagement with a portion of the workpiece upon movement of the carrier to sensing position, a template for controlling the movements of said carrier relative to the workpiece connected to said sensing element to move upon movement of said sensing element, thereby to adjust said template to an operating position in accordance with the position of the portion of the workpiece engaged by said sensing element, means for locking the sensing element and template in the positions to which they have moved, a tool, means for moving the tool in two directions at right angles to one another to machine the workpiece, and means including said template for controlling the movement in said two directions of said tool during the machining operation when said carrier is in control position thereby to control the shape produced on the workpiece.

3. A machine tool for finish-machining a workpiece, comprising a rotary support for the workpiece, a movable sensing element, means for moving the sensing element into engagement with the workpiece prior to a machining operation, a tool, means for moving the tool to effect machining of the workpiece, means including a template for controlling the machining operation, and means connected to the sensing element for adjusting the template prior to the machining operation selectively to one of a plurality of selected positions, thereby to cause the tool to machine the workpiece during the machining operation to one of a plurality of selected diameters.

4. A machine for machining axles and the like, comprising a workhead, means on said workhead for rotatably supporting a workpiece, a set of tools for machining the workpiece, a carrier pivotally connected to said workhead, sensing means mounted on said carrier for sensing the diameter of said workpiece, a template movably mounted on said carrier and connected to said sensing means to be positioned thereby upon engagement of the sensing means with the workpiece, a tracer for engaging said template, means for swinging the carrier in one direction about its pivot to bring the sensing means into engagement with the workpiece, and for swinging the carrier in the opposite direction to bring said template into operative relation to said tracer, means for moving the tools axially and radially of the workpiece, and for simultaneously moving said tracer along said template, and means operable by said tracer as it moves along said template to control the radial and axial movements of the tool.

5. A machine for machining axles and the like, comprising a work support, a carrier, a plurality of sensing elements adjustably mounted on said carrier, means for moving said carrier into and out of operative relation with the work support prior to a machine operation, means for moving said sensing elements independently of said carrier and of one another into engagement with the workpiece when the carrier is in operative relation with the work support, a template connected to each sensing element to be positioned by the associated sensing element when the sensing element is in engagement with the workpiece, a plurality of tools for machining different portions of the workpiece, means for moving the different tools relative to the work support and templates when the carrier is out of operative relation with the work support, means including a stylus movable with the tools and engageable with the templates, when the carrier is out of operative relation with the work support, for controlling the shape produced on a workpiece which is carried by the work support, and means movable with the tools for selectively moving the different tools into and out of engagement with the workpiece as the stylus travels along the templates.

6. A machine for machining an axle or the like comprising a work support, a plurality of sensing elements, a carrier on which said sensing elements are adjustably mounted, means for moving said carrier into and out of operative relation with a workpiece mounted on said work support, means for moving said sensing elements into engagement with the workpiece prior to the machining operation when the carrier is in operative relation with the work support, a tool support, a plurality of tools mounted on the tool support and movable thereon into and out of engagement with the workpiece when the carrier is out of operative position, means for moving the tool support longitudinally of the work support to effect the machining operation, and means connected to the sensing elements and positionable thereby upon engagement of the sensing elements with the workpiece to selectively determine which tools will engage different portions of the workpiece as the tool support moves longitudinally of the workpiece during the machining operation.

7. A machine for machining an axle or the like comprising a work support, a plurality of sensing elements, a carrier on which said sensing elements are adjustably mounted, means for moving said carrier into and out of operative relation with a workpiece mounted on said work support, means for moving said sensing elements into engagement with the workpiece prior to the machining operation when the carrier is in operative relation with the work support, a tool support, means for moving the tool support longitudinally of the work support to effect the machining operation, a plurality of tools mounted on the tool support and movable thereon into and out of engagement with the workpiece, a template connected to each sensing element to be positioned thereby when the sensing element is engaged with the workpiece, control means also connected to the sensing elements and also positionable thereby upon engagement of the sensing elements with the workpiece to selectively determine which tool is in engagement with the workpiece at a particular portion of the movement of the tool support longitudinally of the workpiece, means for moving the tool support toward and from the workpiece during its longitudinal movement to control the shape produced on the workpiece, a tracer element mounted on the tool support and positioned to be disposed in operative relation with the templates when the carrier is out of operative relation with the workpiece for controlling the means for moving the tool support longitudinally of the work support and the means for moving the tool support toward and from the work support thereby to control the paths of movement of each tool when it is in engagement with the workpiece, and means carried by the tool support for engaging said control means to select which tool is in engagement with the workpiece as the tool support moves longitudinally relative to the work support.

8. In a machine of the character described for machining a rotary workpiece that is of different diameters at different points along its length and that has its portions of different diameter connected by curved shoulders, a work support, a carrier movable toward and from the work support between sensing and control positions, a pair of sensing elements adjustably mounted on said carrier, means for moving said sensing elements independently of one another radially of the workpiece into engagement with the workpiece prior to machining the workpiece when said carrier is in sensing position, means for moving said sensing elements independently of one another longitudinally of the workpiece also when said carrier is in sensing position to engage the two sensing elements with two adjacent longitudinally-spaced shoulders of the workpiece, a template connected to each sensing element to be adjustable radially and longitudinally of the workpiece simultaneously with the adjustment of the sensing elements radially and longitudinally of the workpiece, one of said templates, at least, having a curved portion to control the machining of a curved shoulder between two portions of the workpiece that are of different diameters, a tool carriage movable longitudinally of the workpiece, a cross slide mounted on the tool carriage for movement radially of the workpiece, a pair of tools for machining the last-named curved shoulder and the adjoining portion of the workpiece, respectively, one of said tools, at least, being movably mounted on said tool support for movement into and out of operative position, a tracing element disposed to engage the templates when the carrier is in control position, means operatively connecting said tracing element to said one tool to cause said one tool to follow a path conforming to the shape of said one template as said carriage moves longitudinally of the workpiece, and means for moving the second tool into operative position before said tracing element disengages from said one template whereby said second tool may machine the said portion of said workpiece which adjoins said shoulder to the desired diameter as said second tool travels longitudinally of the work without affecting the radius of said shoulder.

9. In a machine of the character described, for machining a rotary workpiece that has a plurality of longitudinally spaced shoulders which respectively join portions of the workpiece that are respectively of different diameter, a work support for rotatably supporting a workpiece, a carrier movable toward and from said work support between sensing and control positions, a plurality of pairs of sensing elements mounted on said carrier for movement radially and longitudinally of the workpiece, means for moving said sensing elements radially into engagement with the workpiece prior to machining the workpiece when the carrier is in sensing position, means for moving the two members of a pair of sensing elements apart longitudinally of the workpiece, when said carrier is in sensing position, to engage the two sensing elements of the pair with adjacent longitudinally spaced shoulders of the workpiece, tool means for machining the workpiece, means for moving said tool means longitudinally of the workpiece, and means for moving said tool means radially of the workpiece, comprising a template secured to each of said sensing elements, to be positioned thereby prior to the machining operation, and a tracing element connected to said tool means to engage the templates when said carrier is in control position to control the movement of said tool means radially of the workpiece during movement of said tool means longitudinally of the workpiece.

10. In a machine tool, a pair of axially-aligned rotary work spindles, a center reciprocable in each spindle, a movable carrier movable between sensing and control positions, sensing elements mounted on said carrier for both longitudinal and transverse movement, a template secured to each sensing element to be adjusted on movement of the associated sensing element, a tool carriage movable in a direction parallel to the common axis of the work spindles, a cross-slide mounted on the tool carriage for movement transversely of said common axis, a pair of tools mounted on the cross-slide for movement transversely of said common axis, means for moving a workpiece into axial alignment with said spindles, and means operative thereupon in sequence to cause said centers to move toward one another to engage and hold said workpiece between them under a predetermined pressure, to move said carrier into sensing position, to move said sensing elements on said carrier into engagement with the workpiece thereby to position said templates on said carrier, to clamp the sensing elements in work-engaging positions, to move said carrier away from sensing position into control position, and to effect movement of said carriage, and a tracing element mounted on said cross-slide to be disposed in operative relation with said templates when said carrier is in control position, said tracing element being connected to said cross-slide to move the tools radially of the workpiece under control of said templates during longitudinal movement of said carriage, and means for moving one tool into engagement with the workpiece and another out of engagement during said longitudinal movement of the carriage.

11. In a machine tool as claimed in claim 10, an elevator, and means operative in sequence when the machining operation is completed to raise said elevator upward to support the workpiece, to separate said centers from the workpiece, and to cause said elevator to resume its upward movement to discharge the completely machined workpiece from the machine.

12. In a machine tool for machining a rotary workpiece that has at least one curved shoulder joining two peripheral surfaces of respectively different diameters, a rotary work support, a tool support, a plurality of tools mounted on said tool support for selectively machining different portions of a workpiece carried by said work support, means controlling the shape produced on the work by the tools comprising a plurality of templates positioned longitudinally of the workpiece, one of said templates at least being adjustable radially of the work support relative to an adjoining template, and one of said two adjoining templates having a curved portion to control the curve produced on the shoulder of the workpiece, means for sensing the workpiece prior to the machining operation and operatively connected to said adjustable template to adjust said template prior to the machining operation in accordance with the diameter of the workpiece, means for disengaging the sensing means from the workpiece after sensing and prior to the machining operation, means for moving the tool support longitudinally of the workpiece after disengagement of the sensing means therefrom, means for moving the tool support radially of the work support after disengagement of the sensing means therefrom, means including a tracer engaging said templates after disengagement of the sensing means from the workpiece for controlling the radial movement of the tool support as the tool support moves longitudinally, and means for moving one of said tools radially of the work support during the longitudinal movement of the tool support to move said one tool from inoperative to operative position whereby to machine the two portions of the workpiece, which have different diameters, with different tools.

13. In a machine tool as claimed in claim 12, control means carried by said tool support for successively rendering said tracer operative and inoperative as said tool support moves longitudinally of the workpiece.

14. A machine tool comprising a movable sensing element, means for moving said element relative to the workpiece which is to be machined until said element engages a given surface of the workpiece, a template, means connecting said template to said sensing element thereby to position said template relative to the workpiece prior to the machining operation, a tool, means for moving said tool transversely and longitudinally relative to the workpiece to effect the machining operation on the workpiece, and means connected to the tool and positioned to travel on said template during the machining operation to control the movements of the tool during the machining operation.

15. A machine tool comprising a pair of relatively movable sensing elements, means for moving said sensing elements independently of one another into engagement with spaced portions of a workpiece prior to a machining operation on the workpiece, a pair of templates connected, respectively, to the two sensing elements to be positioned thereby independently of one another relative to the workpiece prior to the machining operation upon engagement of said sensing elements with said spaced portions, tool means, means for moving said tool means transversely and longitudinally relative to the workpiece to effect the machining operation, and means for controlling the movement of said tool means in the machining operation comprising a member engageable with said templates successively during the movement of said tool means in the machining operation.

16. A machine for machining an axle or the like comprising a rotary work support, a carrier movable relative to said work support between a sensing position and a control position, means for moving said carrier into sensing position prior to a machining operation on a workpiece carried by said work support, to effect a sensing operation, and for moving the carrier to control position after the sensing operation is completed, stop means limiting the movement of said carrier in both directions, a plate slidable on said carrier, a stop member secured to said plate, fluid-pressure operated means for moving said plate radially of said work support, when said carrier is in sensing position, until said stop member engages a workpiece mounted on said work support thereby to effect a sensing operation, cooperating means on said plate and said carrier for locking said plate on said carrier in that one of a plurality of predetermined positions which is closest to the position at which the movement of said plate toward the workpiece is stopped by the engagement of said stop with the workpiece, a template secured to said plate to be positioned thereby upon locking of said plate to said carrier, a tool, means for moving said tool longitudinally and radially relative to the workpiece, when said carrier is in its control position, to machine the workpiece, and means connected to said tool and engaging said template, when said carrier is in control position, to travel along said template and control the movements of the tool as the tool travels longitudinally of the workpiece.

17. A machine as claimed in claim 16 wherein said locking means comprises a plurality of notches on said carrier extending parallel to one another and to the axis of said work support, and a plurality of fingers pivotally mounted on said plate for pivotal movement about a common axis, said fingers being of progressively different lengths.

18. A machine tool comprising a rotary work support, a carrier movable toward and away from said work support, means for moving said carrier, prior to a machining operation on a workpiece carried by said work support, toward said work support for effecting a sensing operation, a slide slidable on said carrier, a sensing member mounted on said slide, a template secured to said slide to move therewith, means for clamping said slide to said carrier, a stop for limiting movement of the carrier toward the work support, means for releasing said clamping means and moving said slide on said carrier, when said carrier is in sensing position, until said sensing member engages the workpiece, and for then engaging said clamping means again, means operative thereupon to move said carrier away from said work support to a control position, a second stop for limiting movement of said carrier away from said work support, a tool support, a tool mounted thereon, means for moving said tool support longitudinally and radially of said work support during rotation of said work support to cause said tool to effect a machining operation, and a stylus connected to said tool support and positioned to engage said template when said carrier is in control position to travel on said template and control the movement of said tool support during the machining operation.

19. A machine tool as claimed in claim 18 wherein said carrier is pivotally mounted for movement toward and away from the work support about an axis parallel to the axis of rotation of said work support.

20. A machine for machining an axle and the like, comprising a rotary support for a workpiece, a carrier movable toward and away from the work support, means for moving said carrier, prior to a machining operation on a workpiece, toward said work support for effecting a sensing operation, a stop for limiting movement of said carrier toward said work support, a slide slidable on said carrier toward and away from the workpiece when said carrier is in sensing position, a pair of plates mounted on said slide for movement at right angles thereto longitudinally parallel to the axis of said work support when said carrier is in sensing position, a probe mounted on each plate, a template secured to each of said plates, means for clamping said plates and slide to said carrier, means for releasing said clamping means, when said carrier is in sensing position, fluid-pressure operated means for moving said plates on said slide away from one another, and for moving said slide on said carrier radially toward said work support, when said clamping means is released, to engage said probes with spaced shoulders of the workpiece at the perimeter of said workpiece adjacent said shoulders, means for reengaging said clamping means when the probes engage said shoulders and perimeter, means operative thereupon to move said carrier away from said work support to a control position, a second stop for limiting movement of said carrier away from said work support, a tool support, tool means mounted on said tool support, means for moving said tool support longitudinally and radially of said work support during rotation of said work support to cause said tool means to effect a machining operation, and a stylus connected to said tool support and positioned to engage said template, when said carrier is in control position, to travel on said template and control the radial movement of said tool during the longitudinal movement thereof.

21. A machine as claimed in claim 20 wherein said tool means comprises at least two tools, one of which, at least, is reciprocable on said tool support toward and away from the axis of said work support, when said carrier is in control position, and having means for moving said one tool into operative position after a predetermined amount of travel of said tool support longitudinally with the other tool in operative position.

22. A machine as claimed in claim 21 having a plurality of trip members positioned on said templates in longitudinally spaced relation to one another, and an operating member connected to said stylus to engage said trip members successively as said tool support travels longitudinally to render said stylus alternately operative and inoperative.

23. A machine for machining a rotary workpiece that is of different diameters at different points along its length and that has an arcuate shoulder connecting two such portions of different diameters, comprising a rotary work support for the workpiece, a carrier, means for moving said carrier toward and from said work support to move said carrier from a control position to a sensing position and vice versa, a pair of slides mounted on said carrier for movement independently of one another toward and away from the axis of said work support when said carrier is in sensing position, a probe carried by each slide, a template carried by each slide, one of said templates, at least, having an arcuate guide portion corresponding in curvature to the desired curvature of said shoulder, and the other template having a straight guide surface along a portion of its length at least, means for moving said slides longitudinally and radially of the axis of the work support, when said carrier is in sensing position, to engage said probes with the workpiece at different radial and axial positions, respectively, a tool support movable longitudinally and radially of said work support when said carrier is in control position, a pair of tools mounted on said tool support, one of which is behind the other in the direction of longitudinal travel of said tool support during the machining operation, said one tool being normally retracted from cutting position, a stylus connected to said tool support and positioned to engage said two templates successively, when said carrier is in control position, to travel on said templates successively and control the radial movement of said tool support during its longitudinal movement, and means for moving said one tool into cutting position projecting radially closer to the work support than the cutting position of the other tool prior to discontinuance of cutting by said other tool so that the longiudinal path of cut of said tool may intersect the arcuate path of the other tool, under control of said one template, thereby determining the height of the arcuate shoulder produced on the workpiece.

References Cited in the file of this patent

UNITED STATES PATENTS

| | | |
|---|---|---|
| 1,571,323 | Cole | Feb. 2, 1926 |
| 1,689,710 | Ashton | Oct. 30, 1928 |
| 1,790,848 | Smith et al. | Feb. 3, 1931 |
| 1,854,184 | Flanders | Apr. 19, 1932 |
| 2,433,048 | Himoff | Dec. 23, 1947 |
| 2,713,283 | Lomazzo | July 19, 1955 |
| 2,714,324 | Dinsmore et al. | Aug. 2, 1955 |
| 2,807,973 | Meyer et al. | Oct. 1, 1957 |
| 2,831,387 | Ovshinsky | Apr. 22, 1958 |

FOREIGN PATENTS

| | | |
|---|---|---|
| 1,114,501 | France | Dec. 19, 1955 |
| 1,136,180 | France | Dec. 22, 1956 |